(12) United States Patent
Serkh et al.

(10) Patent No.: US 9,140,338 B2
(45) Date of Patent: Sep. 22, 2015

(54) TENSIONER

(71) Applicant: THE GATES CORPORATION, Denver, CO (US)

(72) Inventors: Alexander Serkh, Troy, MI (US); Dean Schneider, Washington, MI (US)

(73) Assignee: GATES CORPORATION, Denver, CO (US)

( * ) Notice: Subject to any disclaimer, the term of this patent is extended or adjusted under 35 U.S.C. 154(b) by 115 days.

(21) Appl. No.: 14/173,978

(22) Filed: Feb. 6, 2014

(65) Prior Publication Data

US 2015/0219189 A1 Aug. 6, 2015

(51) Int. Cl.
*F16H 7/12* (2006.01)
*F16H 7/14* (2006.01)
*F16H 7/10* (2006.01)
*F16H 7/08* (2006.01)

(52) U.S. Cl.
CPC ...... *F16H 7/1218* (2013.01); *F16H 2007/0842* (2013.01); *F16H 2007/0865* (2013.01); *F16H 2007/0893* (2013.01)

(58) Field of Classification Search
CPC .......... F16H 2007/0874; F16H 7/1281; F16H 2007/0806; F16H 2007/081; F16H 2007/0846
USPC .......................................... 474/134, 112, 117
See application file for complete search history.

(56) References Cited

U.S. PATENT DOCUMENTS

| | | | | |
|---|---|---|---|---|
| 1,338,293 A | * | 4/1920 | Ernest Fuchs | 474/134 |
| 1,579,245 A | * | 4/1926 | Pennington | 305/134 |
| 2,352,797 A | * | 7/1944 | Miller | 474/71 |
| 2,726,364 A | * | 12/1955 | Merritt | 318/475 |
| RE27,861 E | * | 1/1974 | Kraus | |
| 4,416,647 A | * | 11/1983 | White, Jr. | 474/134 |
| 4,758,208 A | * | 7/1988 | Bartos et al. | 474/135 |
| 4,981,116 A | * | 1/1991 | Trinquard | 123/90.31 |
| 6,609,989 B2 | * | 8/2003 | Berger et al. | 474/134 |
| 6,648,783 B1 | * | 11/2003 | Bogner | 474/134 |
| 6,652,401 B2 | * | 11/2003 | Liu | 474/134 |
| 6,960,145 B2 | * | 11/2005 | Fraley et al. | 474/134 |
| 7,494,434 B2 | * | 2/2009 | Mc Vicar et al. | 474/109 |
| 7,901,310 B2 | * | 3/2011 | Lolli et al. | 474/134 |
| 8,057,334 B2 | * | 11/2011 | Kotzur | 474/133 |
| 8,092,328 B2 | * | 1/2012 | Dec et al. | 474/135 |
| 8,327,972 B1 | * | 12/2012 | Schneider et al. | 180/444 |
| 8,353,795 B2 | * | 1/2013 | Montani et al. | 474/134 |
| 8,439,780 B2 | * | 5/2013 | Ruffini et al. | 474/112 |
| 8,602,930 B2 | * | 12/2013 | Deneszczuk et al. | 474/135 |
| 8,821,328 B2 | * | 9/2014 | Jud et al. | 474/134 |
| 2002/0039944 A1 | * | 4/2002 | Ali et al. | 474/135 |

(Continued)

OTHER PUBLICATIONS

European Patent Office, International Search Report PCT/US2015/011927, mailing date Apr. 21, 2015.

*Primary Examiner* — Henry Liu
(74) *Attorney, Agent, or Firm* — Jeffrey A. Thurnau, Esq.; Paul N. Dunlap, Esq.

(57) ABSTRACT

A tensioner comprising a base, a first pivot arm pivotally engaged to the base, a first pulley journalled to the first pivot arm, a second pivot arm pivotally engaged to the base, a second pulley journalled to the second pivot arm, a flexible tensile member having a toothed engagement with the first pivot arm and a toothed engagement with the second pivot arm whereby the first pivot arm and the second pivot arm move in a coordinated manner, and a tensioner assembly pivotally engaged to the base and engaged with the flexible tensile member.

10 Claims, 18 Drawing Sheets

(56) References Cited

U.S. PATENT DOCUMENTS

| | | | |
|---|---|---|---|
| 2002/0086751 A1* | 7/2002 | Bogner et al. | 474/134 |
| 2003/0109342 A1 | 6/2003 | Oliver et al. | |
| 2003/0153421 A1* | 8/2003 | Liu | 474/134 |
| 2003/0176249 A1* | 9/2003 | Polster et al. | 474/134 |
| 2003/0176250 A1* | 9/2003 | Austin et al. | 474/134 |
| 2003/0199350 A1* | 10/2003 | Henry | 474/138 |
| 2003/0216203 A1* | 11/2003 | Oliver et al. | 474/134 |
| 2003/0220164 A1* | 11/2003 | Tamai | 474/134 |
| 2004/0043854 A1* | 3/2004 | Fraley et al. | 474/134 |
| 2004/0072642 A1* | 4/2004 | Serkh | 474/134 |
| 2005/0181901 A1* | 8/2005 | Shin et al. | 474/134 |
| 2006/0100051 A1* | 5/2006 | Di Giacomo et al. | 474/170 |
| 2006/0217222 A1* | 9/2006 | Lolli et al. | 474/134 |
| 2006/0287146 A1* | 12/2006 | McVicar et al. | 474/109 |
| 2007/0037648 A1* | 2/2007 | Di Giacomo et al. | 474/134 |
| 2008/0070730 A1* | 3/2008 | Nelson et al. | 474/134 |
| 2008/0214342 A1* | 9/2008 | Montani et al. | 474/134 |
| 2011/0256971 A1* | 10/2011 | Kilshaw | 474/134 |
| 2011/0294612 A1* | 12/2011 | Kato | 474/91 |
| 2012/0318589 A1* | 12/2012 | Staley et al. | 180/65.21 |
| 2013/0040770 A1* | 2/2013 | Wolf et al. | 474/134 |
| 2013/0203535 A1* | 8/2013 | Mack et al. | 474/134 |
| 2013/0260932 A1* | 10/2013 | Adam et al. | 474/134 |

* cited by examiner

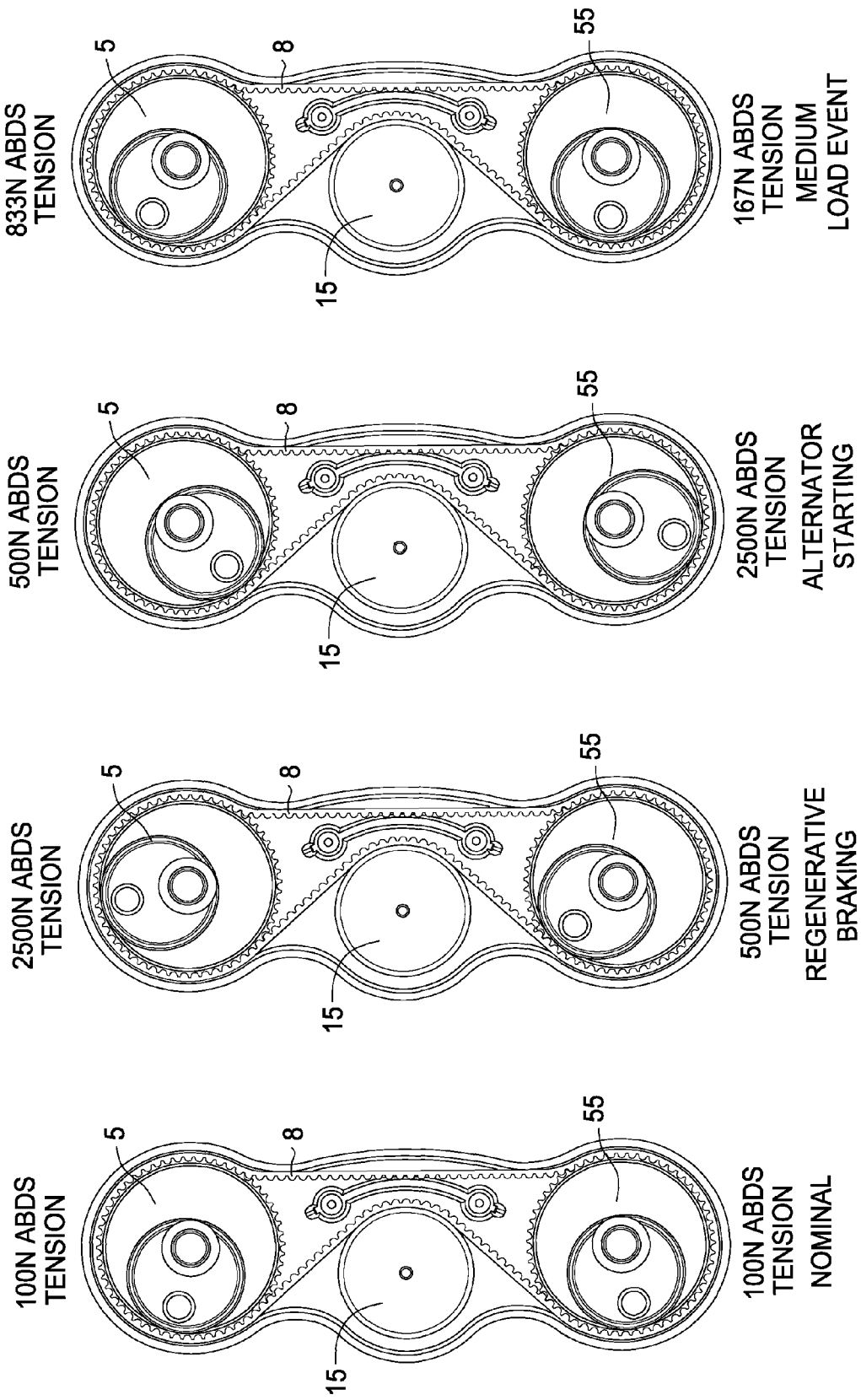

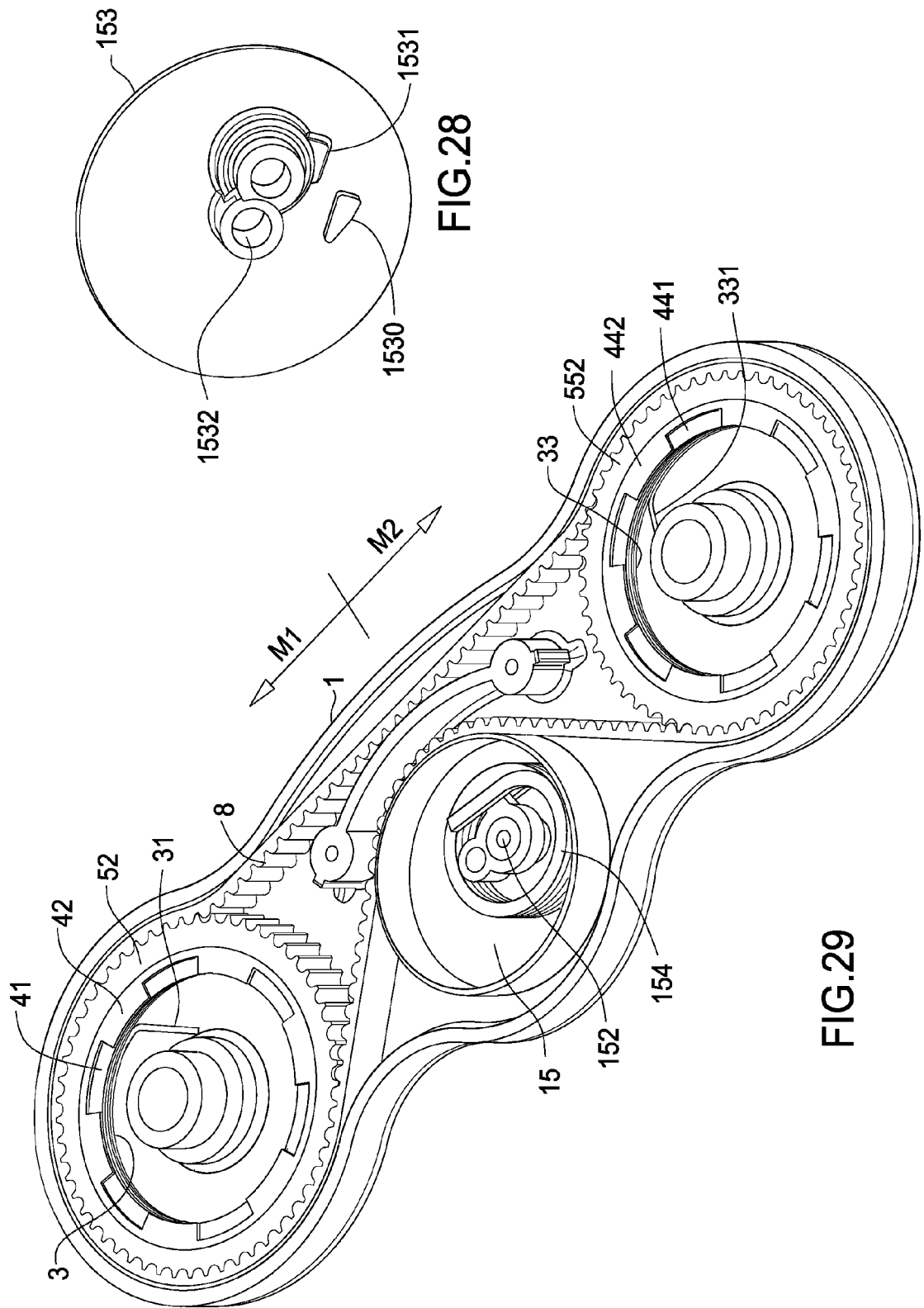

TENSIONER

FIELD OF THE INVENTION

The invention relates to a tensioner, and more particularly, to a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member.

BACKGROUND OF THE INVENTION

In most belt drive applications the ability to maintain proper belt tension is important to ensure power transmission without slippage of the belt. The lowest tension span in a belt drive is commonly referred to as the slack side span. Tensioners are traditionally positioned on the slack side span of a belt drive and are tasked with maintaining the proper minimum belt tension in this span. Using the belt rotation direction as a guide, this span is the span located just after the power providing pulley or crankshaft in this case. For instance, as the crankshaft rotates, the slack side span will be the span where the belt has just left the crankshaft pulley and the tight side span will be the span approaching the crankshaft pulley.

Belt alternator starter (BAS) systems utilize an alternator that also functions as motor. This is sometimes referred to as a motor-generator. The operation of the BAS system is such that when the engine is running, the alternator primarily behaves in a traditional manner and the belt is loaded normally with the power being provided by the engine crankshaft pulley and loaded by the alternator. In BAS systems the drive is typically arranged to position the alternator as the next accessory after the belt passes over the crankshaft. In this arrangement, the belt tensioner should be located between the crankshaft pulley and the alternator. The tensioner is located just before the alternator using the belt rotation direction as a guide.

BAS systems bring a unique problem to the belt drive. The alternator acts as both a load on the belt drive and a power provider for the belt drive. The BAS system alternator is used to start the engine and the alternator is used to provide power to the engine. In start instances, the alternator pulley becomes a power provider for the drive. This typically transforms the location of the slack span in the drive to the span following the alternator pulley. Additionally, the tight side span is now the span between the alternator and the crankshaft. Since a traditional tensioner is designed to simply maintain a minimum level of slack side tension, the now high tension in the belt at the tensioner location causes extreme movement of the tensioner. Additionally, this situation creates the need for a second tensioner in a location on the new slack side span.

The traditional approach to solving this problem is to create a belt drive with two tensioners. This second tensioner is typically a tensioner with high resistance to movement away from the belt. The second tensioner is often an expensive hydraulic tensioner. This two tensioner arrangement also requires an excessively long belt to accommodate the multiple tensioners in the drive. This often results in an expensive solution.

Representative of the art is U.S. Pat. No. 7,494,434 which discloses an accessory drive for an engine with a belt driven starter generator adapted for driving and being driven by the engine. In an exemplary embodiment, the drive includes a first engine drive pulley and a second starter drive pulley. A drive belt engages the drive pulleys for driving either pulley from the other. A dual belt tensioner made as a preassembled unit has a carrier with a central pivot mounted to the engine and first and second carrier arms extending radially from the central pivot. A first tensioner mounted on the first arm carries a first tensioner pulley biased against a first belt run adjacent the second drive pulley that is slack during engine starting. A second tensioner pulley carried on the second arm is biased against a second belt run adjacent the second drive pulley that is taut during engine starting A hydraulic strut connected to the second arm, and preferably included in the preassembled unit, provides moderate biasing for the second tensioner pulley during normal engine operation and velocity sensitive resistance, to increased belt forces, that limits reactive movement of the second tensioner pulley during engine starting and transient engine operation.

What is needed is a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member. The present invention meets this need.

SUMMARY OF THE INVENTION

The primary aspect of the invention is to provide a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member.

Other aspects of the invention will be pointed out or made obvious by the following description of the invention and the accompanying drawings.

The invention comprises a tensioner comprising a base, a first pivot arm pivotally engaged to the base, a first pulley journalled to the first pivot arm, a second pivot arm pivotally engaged to the base, a second pulley journalled to the second pivot arm, a flexible tensile member having a toothed engagement with the first pivot arm and a toothed engagement with the second pivot arm whereby the first pivot arm and the second pivot arm move in a coordinated manner, and a tensioner assembly pivotally engaged to the base and engaged with the flexible tensile member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 22A illustrates pivot arm position during an operating condition.

FIG. 22B illustrates pivot arm position during an operating condition.

FIG. 22C illustrates pivot arm position during an operating condition.

FIG. 22D illustrates pivot arm position during an operating condition.

FIG. 28 is a bottom view of the tensioner arm.

FIG. 29 is a perspective view of section 29-29 from FIG. 2.

DETAILED DESCRIPTION OF THE PREFERRED EMBODIMENT

Figure 1:
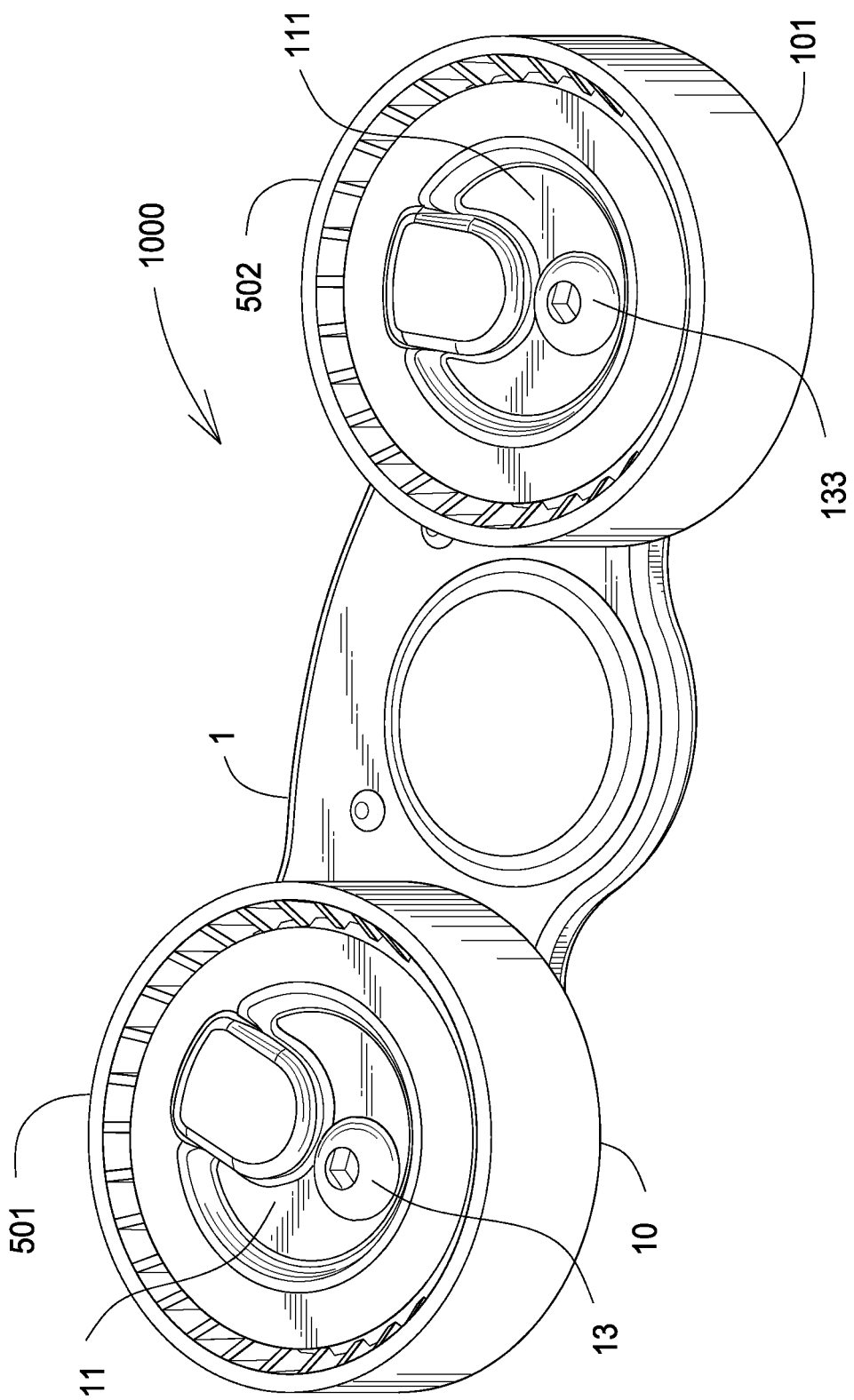
FIG. 1 is a top perspective view of the device.

FIG. 1 is a top perspective view of the device. The inventive tensioner 1000 comprises a first tensioner assembly 501 and a second tensioner assembly 502 each pivotally mounted to a base 1.

Figure 2:
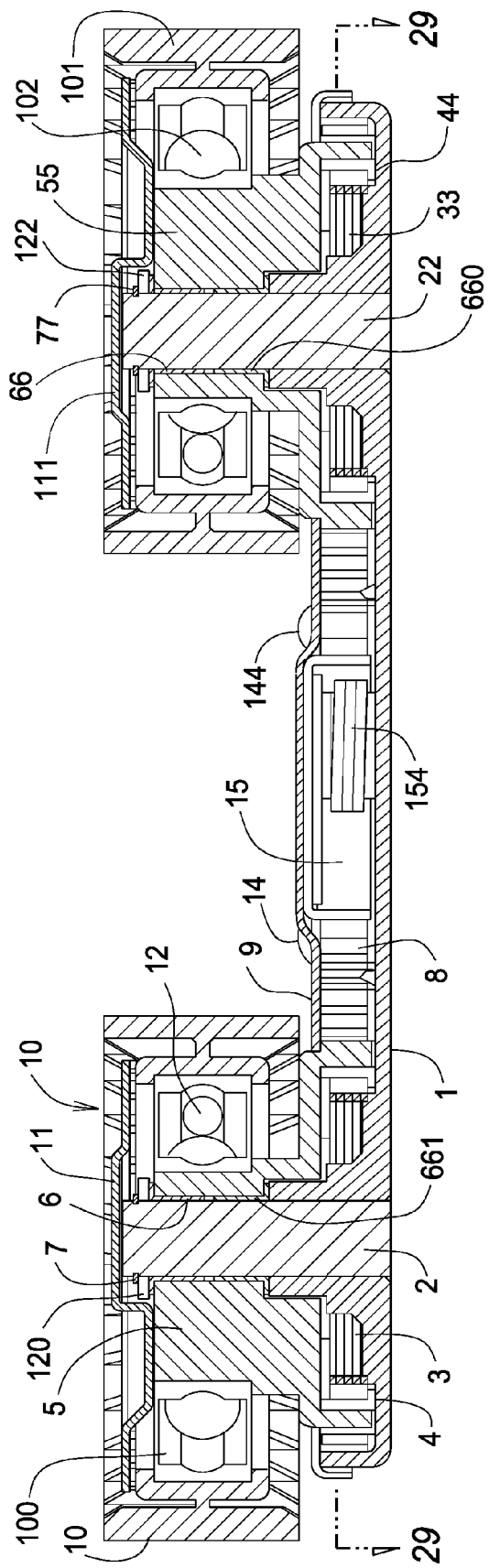
FIG. 2 is a cross-section view of the device.

FIG. 2 is a cross-section view of the device. Extending from base 1 is shaft 2 and shaft 22. Pivot arm 5 is pivotally journalled to shaft 2 through a bushing 6. The pivot axis of pivot arm 5 is coaxial with shaft 2. Pivot arm 55 is pivotally journalled to shaft 22 through a bushing 66. The pivot axis of pivot arm 55 is coaxial with shaft 22. Shaft 2 and shaft 22 are not coaxial. The pivot axis of arm 5 is not coaxial with the pivot axis of arm 55.

Clutch spring 3 is engaged between damping assembly 4 and base 1. Clutch spring 33 is engaged between damping assembly 44 and base 1. Pulley 101 is journalled to pivot arm 55 through bearing 102. Pulley 10 is journalled to pivot arm 5 through bearing 12. Clutch spring 3 and clutch spring 33 are used to activate the damping function.

Fastener 14 and fastener 144 retain cover 9 on base 1. Arm 5 is retained on base 1 by retaining ring 7. Tensioner assembly 15 is retained on base 1 by cover 9. Cover 9 protects the internal components from debris.

Figure 3:
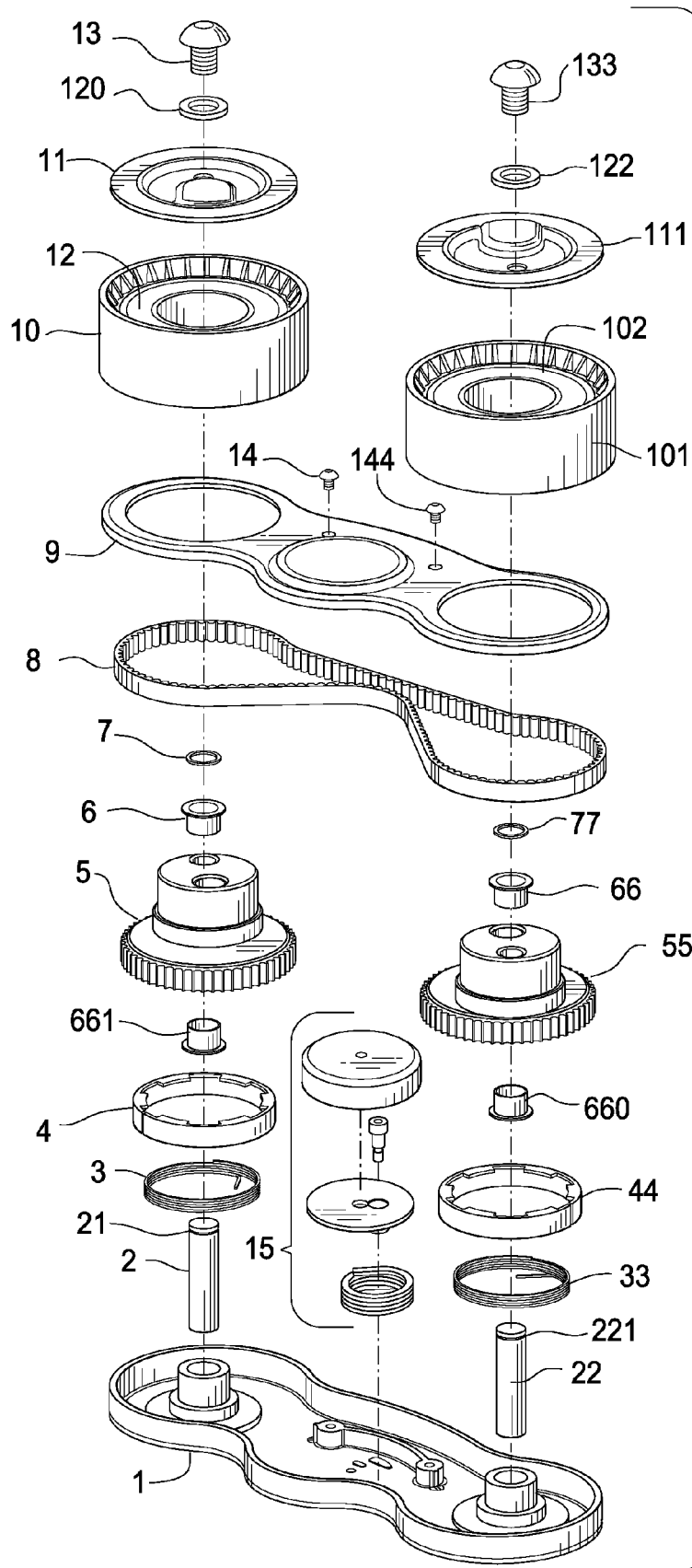
FIG. 3 is an exploded view of the device.

FIG. 3 is an exploded view of the device. Washer 120 is disposed between retaining ring 7 and bushing 6. Washer 122 is disposed between retaining ring 77 and bushing 66. Arm 5 pivots about bushing 6 and bushing 661. Arm 55 pivots about bushing 660 and bushing 66. Fastener 13 engages arm 5. Fastener 133 engages arm 55.

Figure 4:
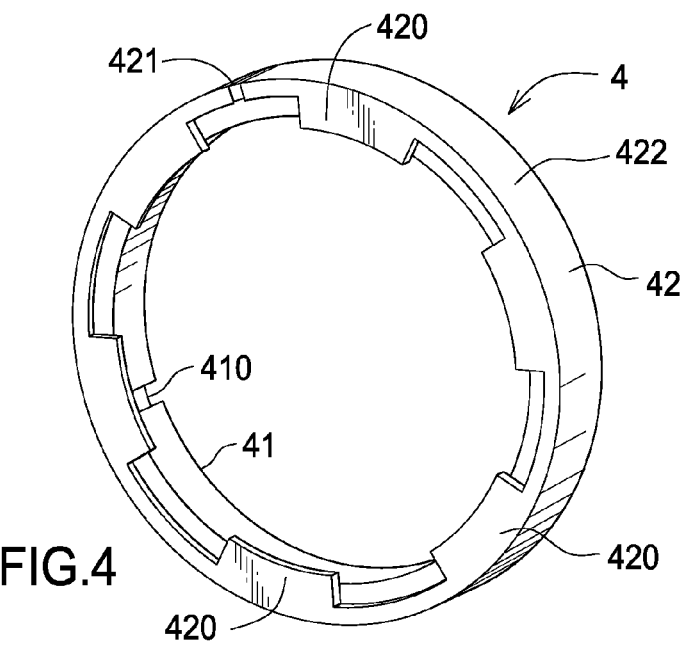
FIG. 4 is a detail of a damping assembly.
Figure 5:
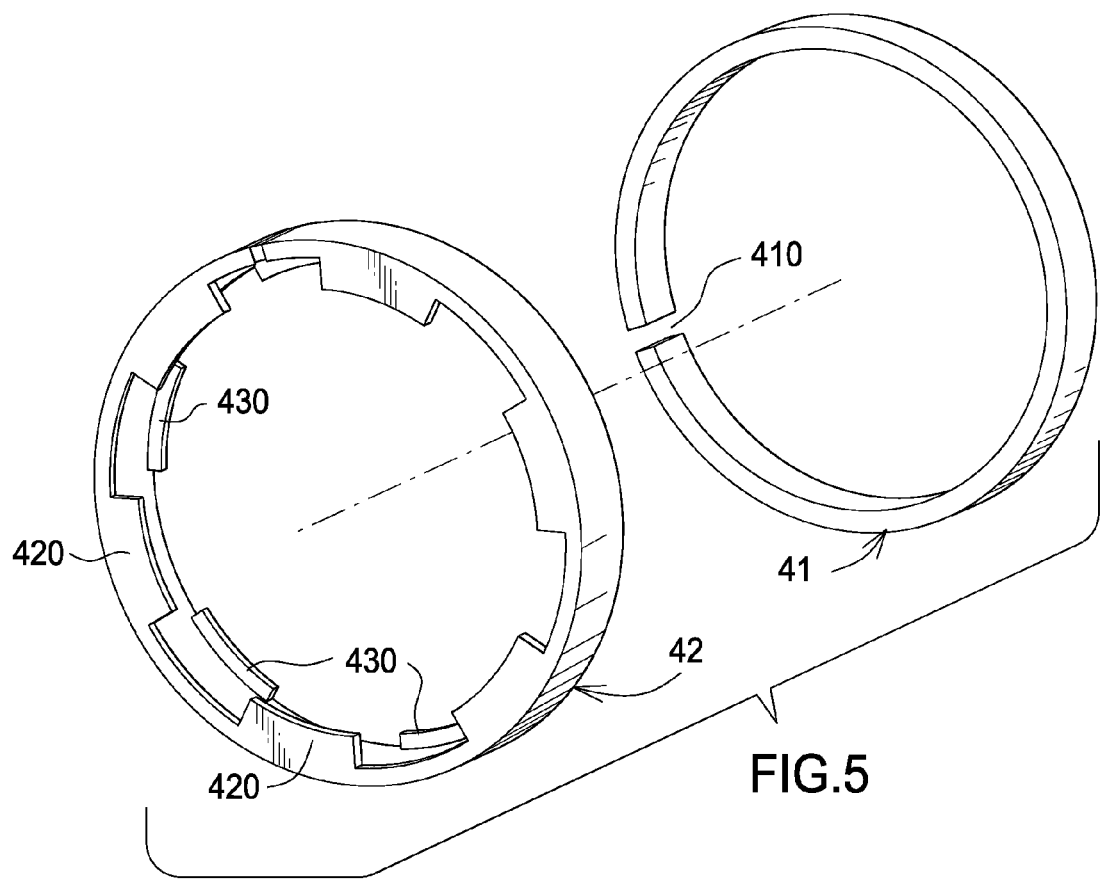
FIG. 5 is an exploded view of the damping assembly in FIG. 4.

FIG. 4 is a detail of a damping assembly. FIG. 5 is an exploded view of the damping assembly in FIG. 4. Damping assembly 4 comprises damping shoe 41 and damping ring 42.

Damping ring 42 is coaxial with damping shoe 41. Damping ring 42 is cylindrical in shape with a gap 421 in an axial direction. Damping ring 42 has a plurality of tabs 420 and 430 projecting inwardly for containing damping shoe 41. Damping shoe 41 is cylindrical in shape with a gap 410 in an axial direction. The outer surface 422 of damping ring 42 frictionally engages inner surface 51 of pivot arm 5.

Figure 6:
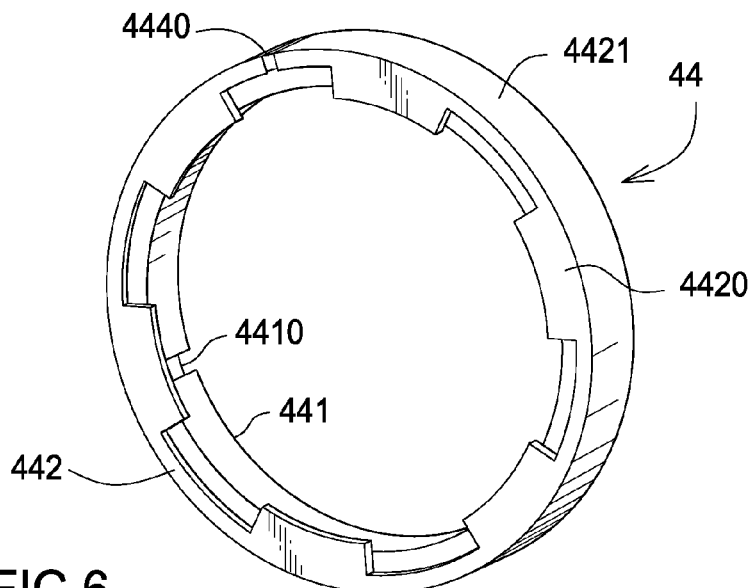
FIG. 6 is a detail of a damping assembly.
Figure 7:
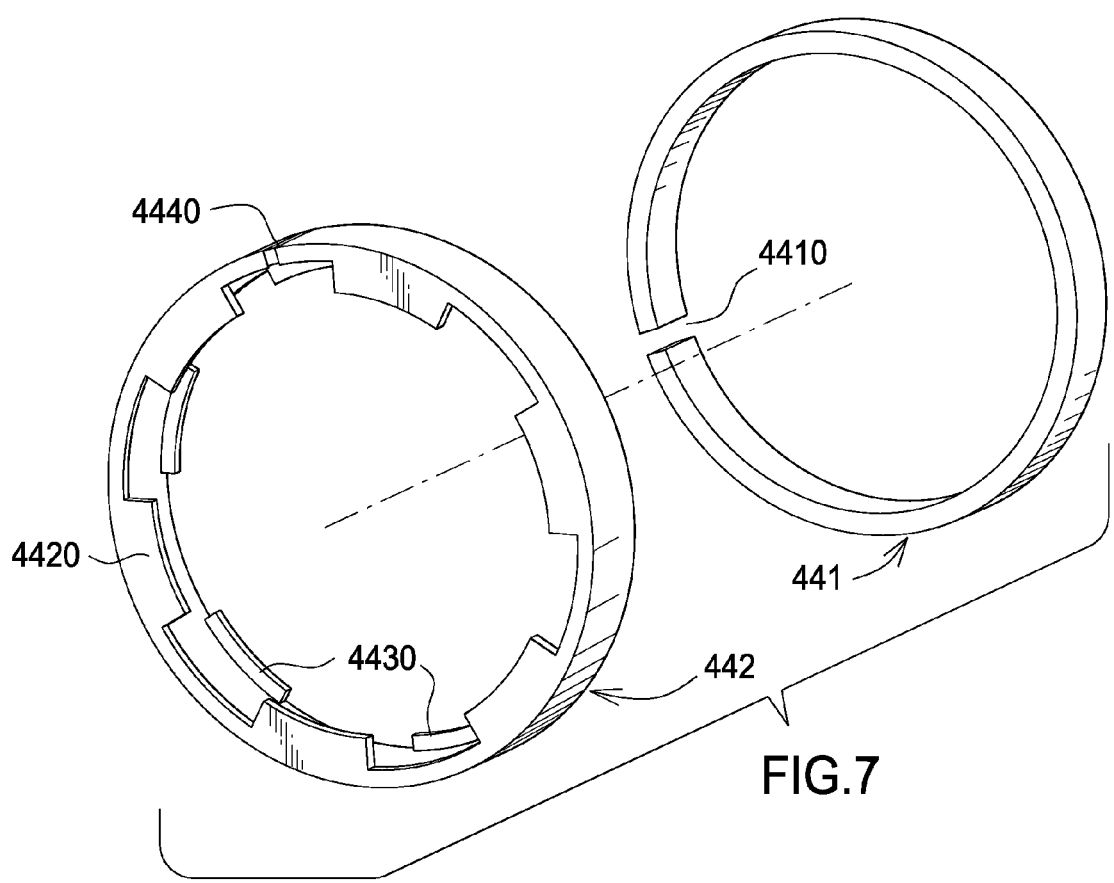
FIG. 7 is an exploded view of the damping assembly in FIG. 6.

FIG. 6 is a detail of a damping assembly. FIG. 7 is an exploded view of the damping assembly in FIG. 6. Damping assembly 44 comprises damping shoe 441 and damping ring 442. Damping ring 442 is coaxial with damping shoe 441. Damping ring 442 is cylindrical in shape with a gap 4440 extending axially. Damping ring 442 has a plurality of tabs 4420 and tabs 4430 projecting inward for containing damping shoe 441. Damping shoe 441 is cylindrical in shape with a gap 4410 extending axially. The outer surface 4421 of damping ring 442 frictionally engages inner surface 551 of pivot arm 55.

Figure 8:
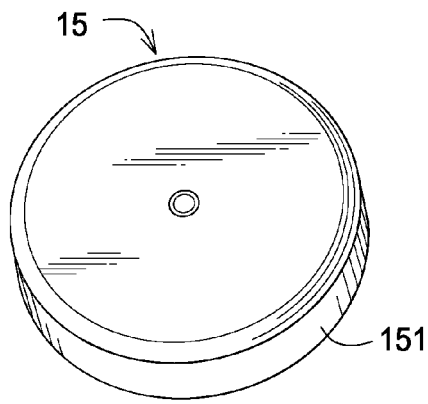
FIG. 8 is a top perspective view of a synchronous tensioner assembly.
Figure 9:
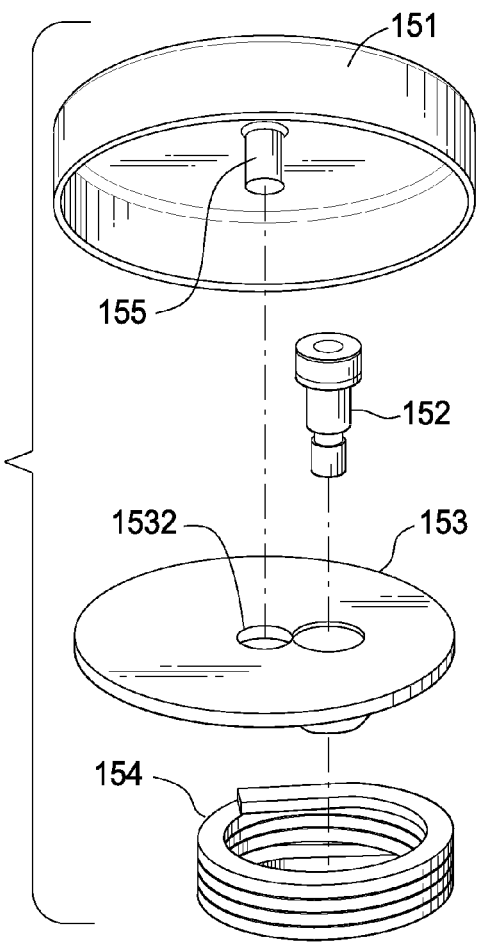
FIG. 9 is an exploded view of the synchronous tensioner assembly in FIG. 8.
Figure 23:
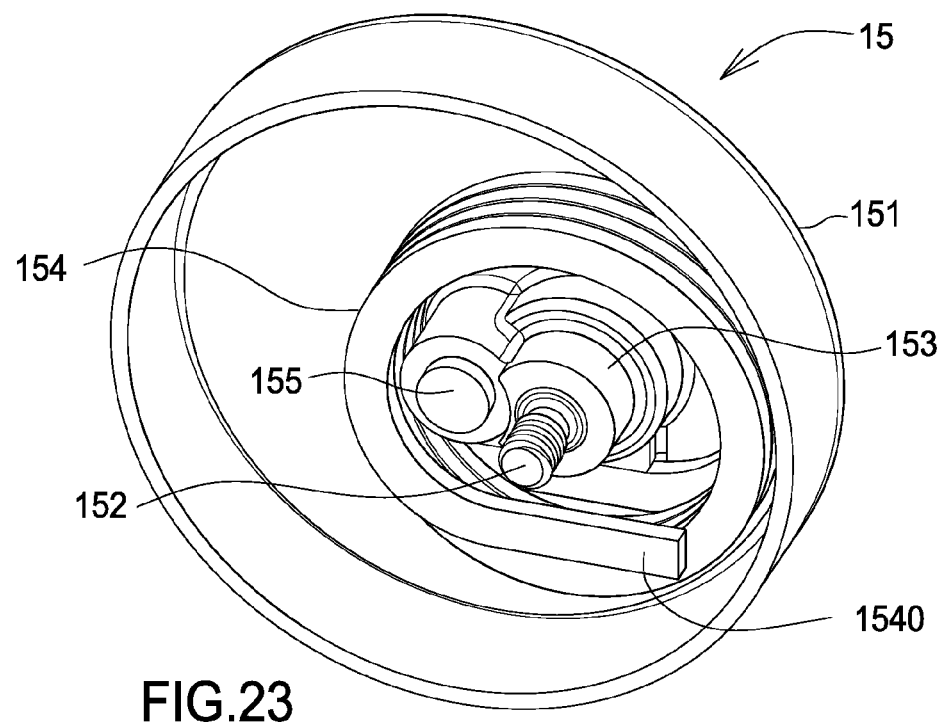
FIG. 23 is an underside view of the tensioner assembly in FIG. 8.
Figure 24:
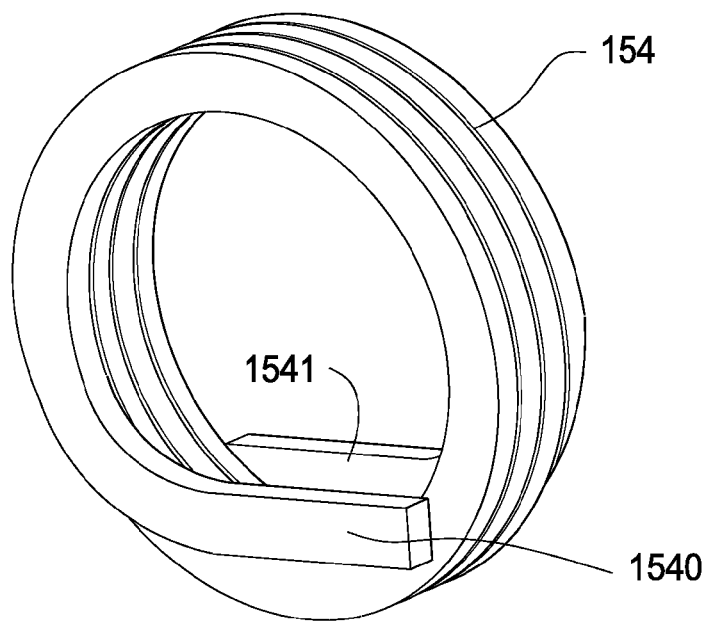
FIG. 24 is a detail of a tensioner spring.
Figure 25:
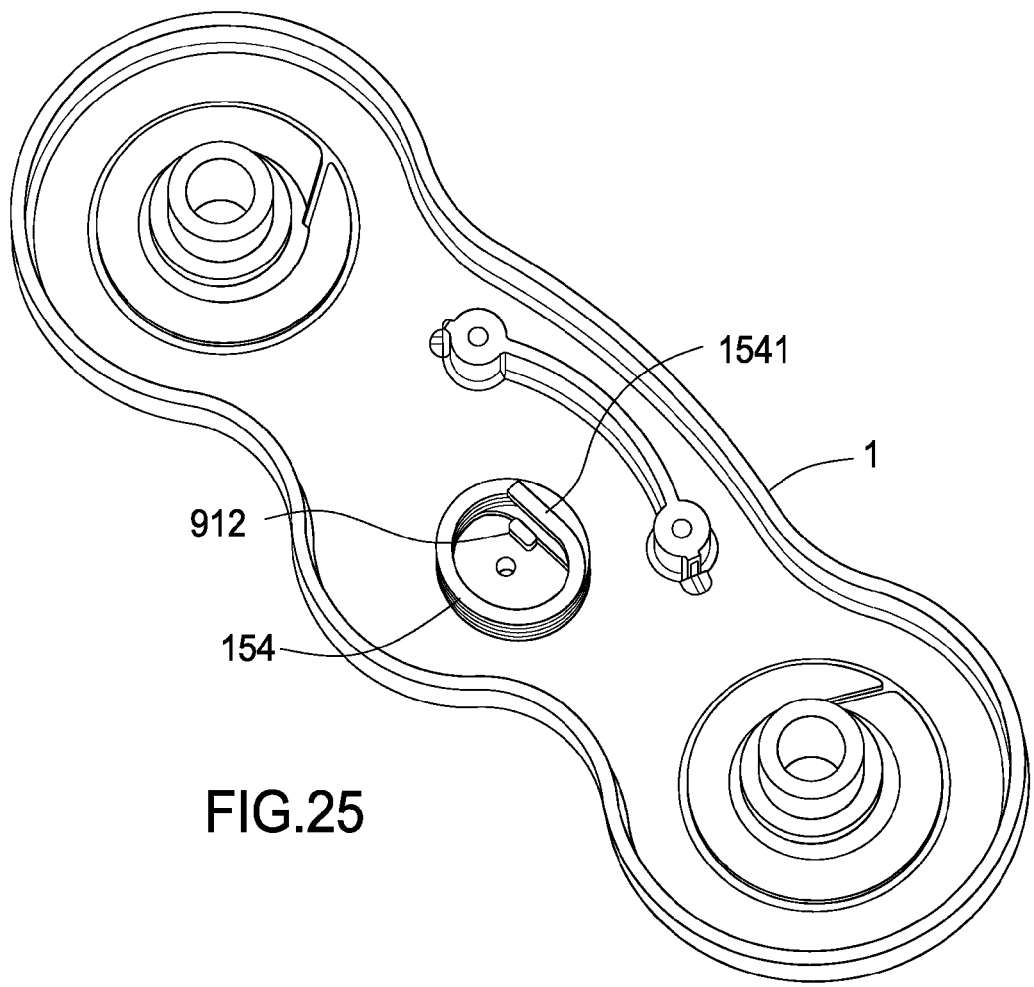
FIG. 25 is a detail of the base.

FIG. 8 is a top perspective view of a tensioner assembly. FIG. 9 is an exploded view of the tensioner assembly in FIG. 8. Synchronous tensioner assembly 15 comprises a rotatable belt guide 151, fastener 152, arm 153 and spring 154. Belt guide 151 is journalled to arm 153 by shaft 155. Shaft 155 engages hole 1532 in arm 153. Arm 153 is pivotally attached to base 1 by fastener 152. Spring 154 is fixedly attached to arm 153 by tab 1530 and tab 1531, see FIG. 28. Spring 154 acts as a biasing member to apply a torque to arm 153, which then applies load to belt 8. FIG. 23 is an underside view of the tensioner assembly in FIG. 8. FIG. 24 is a detail of a tensioner spring. FIG. 25 is a detail of the base. Spring end 1540 is engaged between tab 912 and tab 913 in base 1 which prevents rotation of spring 154 when loaded, see FIG. 21 and FIG. 25.

Shaft 2 is fixedly attached to base 1. Clutch spring 3 is fixedly attached to base 6 through tang 31 which engages slot 911 of base 1, see FIG. 19 and FIG. 21. Pivot arm 5 and bushing 6 and bushing 661 are journalled to shaft 2 through bore 54. Washer 120 is coaxial with shaft 2. Retaining ring 7 is fixedly located on shaft 2 in groove 21. Damping assembly 4 is coaxial with pivot arm 5.

Shaft 22 is fixedly attached to base 1. Clutch spring 33 is attached to base 1 through tang 331 which engages slot 910, see FIG. 20 and FIG. 21. Pivot arm 55 and bushing 66 and bushing 660 are pivotally attached to shaft 22 through bore 554. Washer 122 is coaxial with shaft 22. Retaining ring 77 is fixedly located on shaft 22 in groove 221. Retaining ring 7 retains arm 5 on shaft 2. Retaining ring 7 is fixedly located on shaft 2 in groove 21. Retaining ring 77 retains arm 55 on shaft 22. Damping assembly 44 is coaxial with pivot arm 55. Damping assembly 44 frictionally engages pivot arm damping surface 551.

Figure 10:
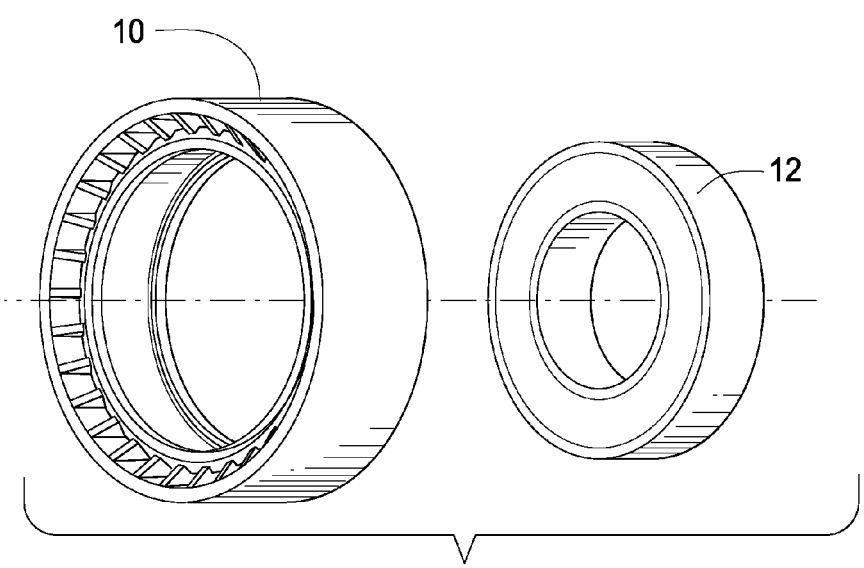
FIG. 10 is an exploded view of an idler assembly.
Figure 11:
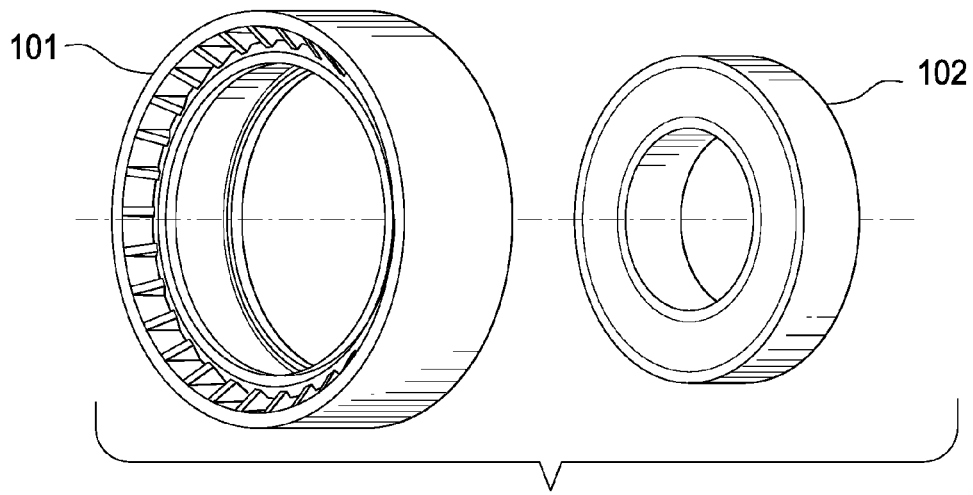
FIG. 11 is an exploded view of an idler assembly.

FIG. 10 is a detail of an idler assembly. FIG. 11 is a detail of an idler assembly. Pulley 10 is journalled to bearing 12. Bearing 12 is journalled to pivot arm 5 on surface 53. Pulley 101 is journalled to bearing 102. Bearing 102 is journalled to pivot arm 55 on surface 553.

Figure 12A:
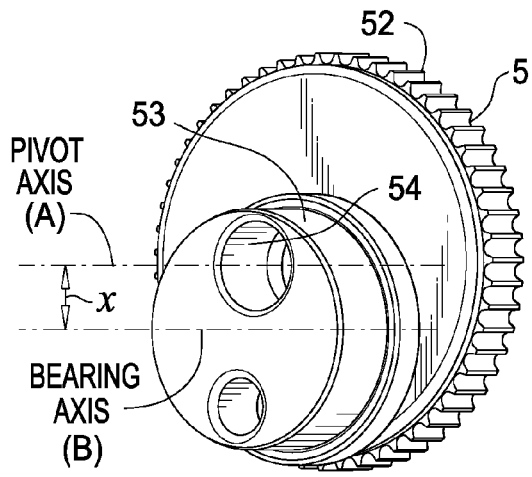
FIG. 12A is a detail of a pivot arm.
Figure 12B:
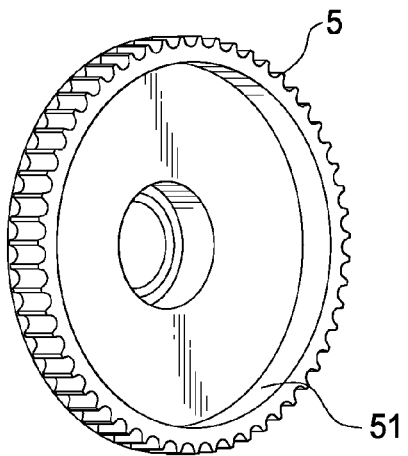
FIG. 12B is a detail of a pivot arm.
Figure 13A:
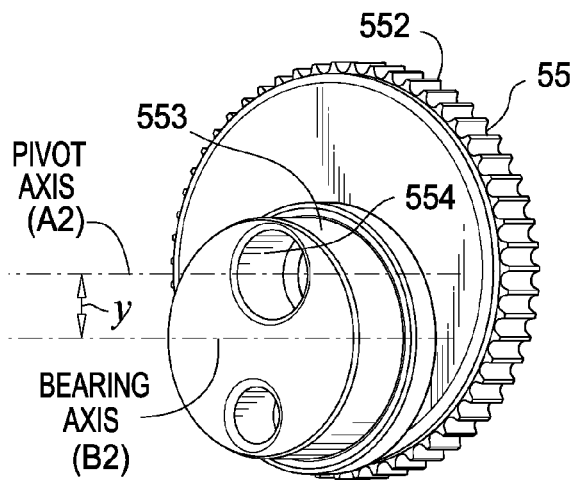
FIG. 13A is a detail of a pivot arm.
Figure 13B:
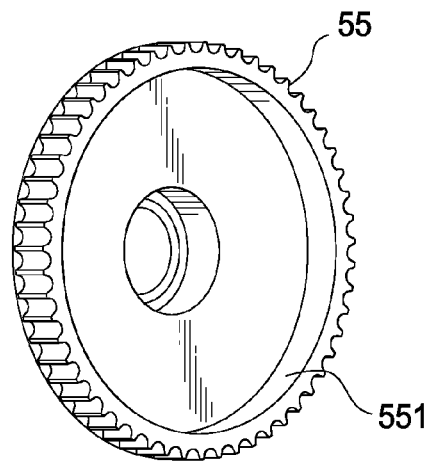
FIG. 13B is a detail of a pivot arm.

FIG. 12A is a detail of a pivot arm. FIG. 12B is a detail of a pivot arm. FIG. 13A is a detail of a pivot arm. FIG. 13B is a detail of a pivot arm. Pivot arm bearing mounting surface 53 receives bearing 12 and is not coaxial with pivot arm bore 54, see bearing axis (A) and pivot axis (B) respectively. Pivot arm bearing mounting surface 553 receives bearing 102 and is not coaxial with pivot arm bore 554. Bore 54 engages shaft 2 which receives fastener 13. Bore 554 engages shaft 22 which receives fastener 133.

Pivot arm 5 pivots about the pivot axis (A). Bearing 12 rotates about the bearing axis (B). Bearing axis (B) and pivot axis (A) are not coaxial, and instead are offset from each other by a distance (X).

Pivot arm 55 pivots about the pivot axis (A2). Bearing 102 rotates about the bearing axis (B2). Bearing axis (B2) and the pivot axis (A2) are not coaxial, and instead are offset from each other by a distance (Y).

Belt 8 engages sprocket 52 and sprocket 552 on pivot arm 5 and pivot arm 55 respectively. Belt 8 may be toothed, but may also comprise any flexible member suitable for bearing a tensile load. Sprocket 52 and sprocket 552 are each toothed to positively engage belt 8.

Figure 14:
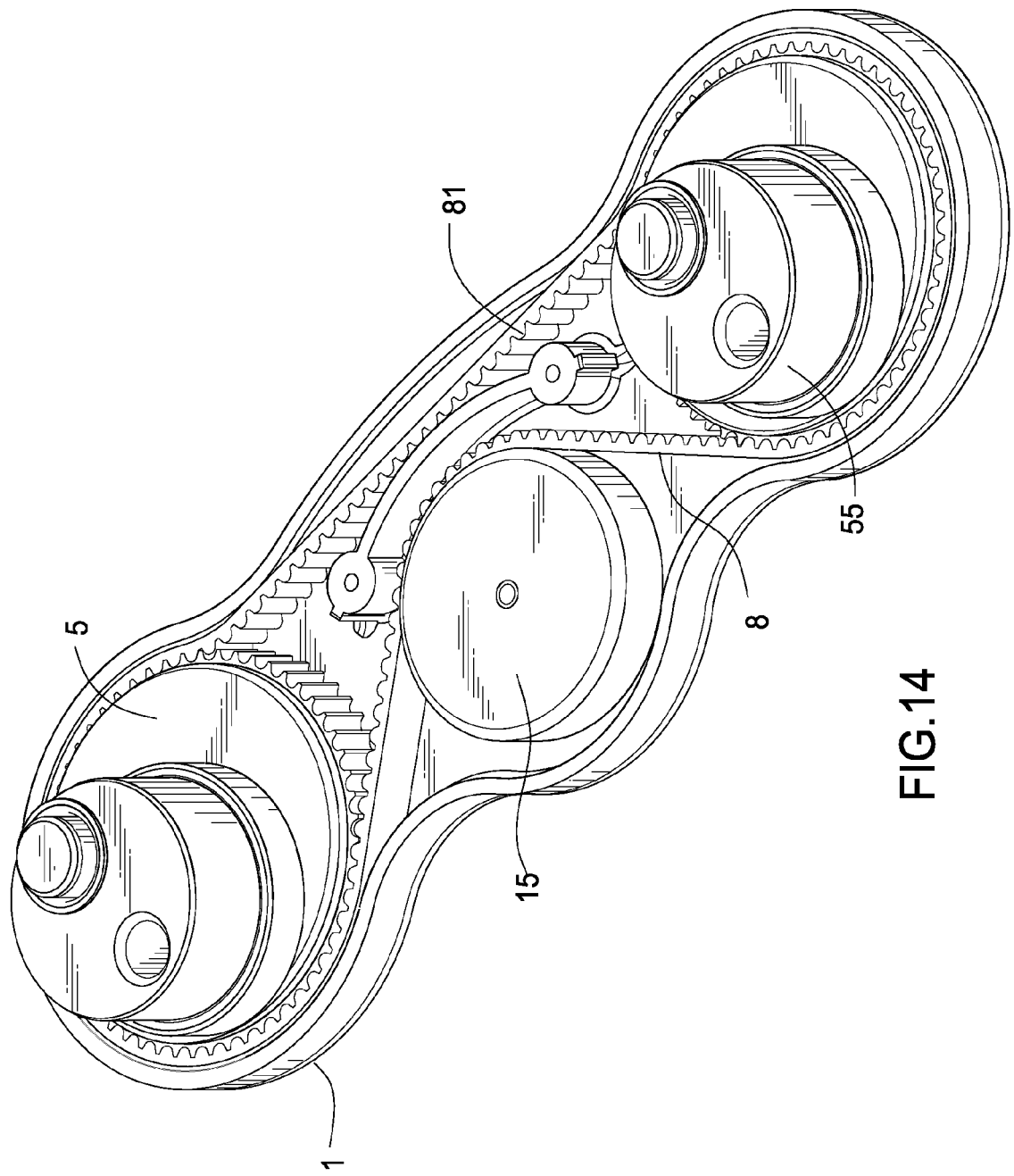
FIG. 14 is a top perspective view of the internals of the device.

FIG. 14 is a top perspective view of the internals of the device. Belt 8 engages tensioner assembly 15. All tensile loads in belt 8 and in belt 200 are imparted by tensioner assembly 15. Rotation of pivot arm 5 causes movement of belt 8 which in turn causes movement in a synchronized or coordinated manner of pivot arm 55 in the same rotational direction as pivot arm 5. Rotation of pivot arm 55 causes movement of belt 8 which in turn causes movement in a synchronized or coordinated manner of pivot arm 5 in the same rotational direction as pivot arm 55, as well. Hence, in operation pivot arm 5 and pivot arm 55 move substantially simultaneously by action of belt 8.

A "synchronized" movement may be described as a movement of pivot arm 5 and pivot arm 55 wherein each pivot arm rotates at substantially the same time through substantially the same angle. A "coordinated" movement may be described as a movement of pivot arm 5 and pivot arm 55 wherein each pivot arm rotates at substantially the same time, but not through an identical angle for both pivot arms. Rotation of the pivot arms through non-identical angles may be caused by stretch of belt 8 for example, as explained herein, see FIG. 22.

Figure 15:
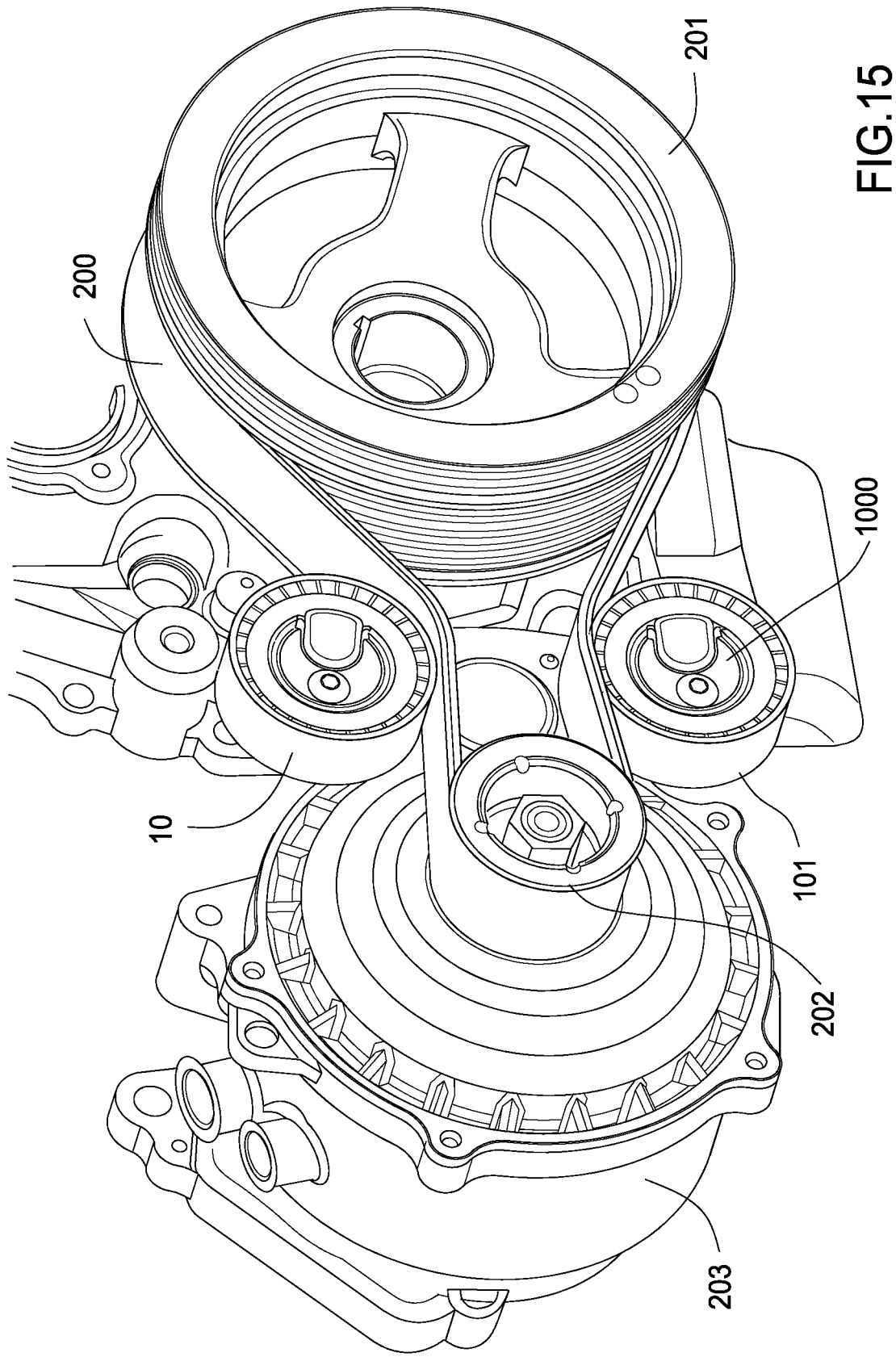
FIG. 15 is a detail of the device in an operating position on an engine.

FIG. 15 is a detail of the device in an operating position on an engine. In a typical asynchronous accessory belt drive system (ABDS) the inventive device 1000 is arranged such as shown in FIG. 15. Tensioner 1000 is mounted to the alternator 203 using fasteners 13 and 133. Belt 200 is routed around a crankshaft pulley 201, alternator pulley 202 and tensioner pulley 10 and pulley 101. This arrangement disposes the belt spans on either side of alternator pulley 202. Tension in belt 200 is maintained by operation of tensioner 1000 and the position of pulley 10 and pulley 101. Belt 200 is typically a multi-ribbed belt known in the art, namely, it comprises multiple ribs running in the longitudinal or endless direction.

The position of pivot arm 5 and thus pulley 10 is controlled by belt 8. The position of pivot arm 55 and thus pulley 101 is also controlled by belt 8. Tension in belt 8 is controlled by the position of pulley 10 and pulley 101. Tension in belt 8 is maintained by tensioner assembly 15. The span of belt 8 that engages tensioner assembly 15 is the tight side span of belt 8. The remaining span 81 of belt 8 does not require any tensioning. The tension in belt 8 creates torque on pivot arm 5 and pivot arm 55 through its engagement with sprocket 52 and sprocket 552 respectively.

Figure 16:
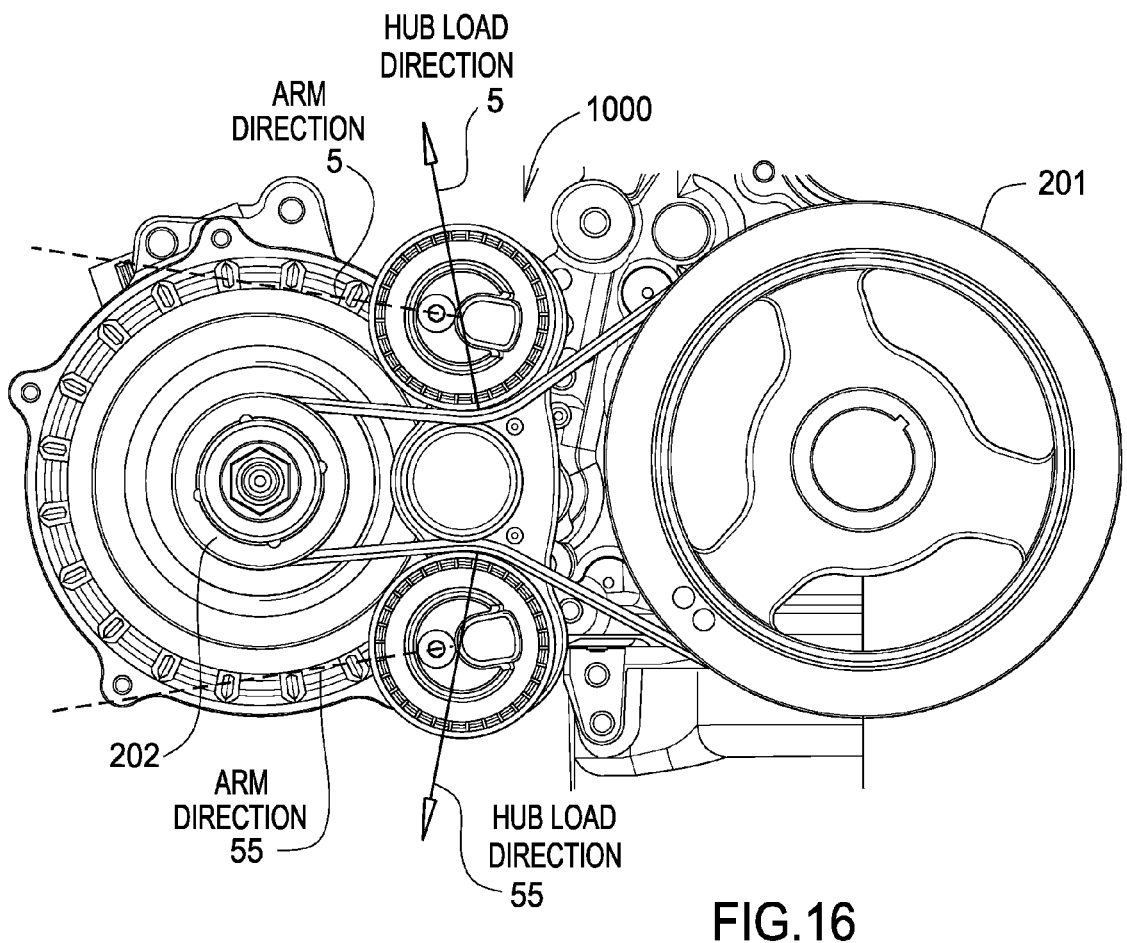
FIG. 16 shows the orientation of pivot arm 5 and pivot arm 55 and the hub load in the at rest position.

FIG. 16 shows the orientation of pivot arm 5 and pivot arm 55 and the hub load in the "at rest" position. When the engine accessory drive is in the at rest position, the tension in belt 200 is equalized throughout the belt. Tension of belt 200 in this condition is the initial belt tension and it is established by the inventive tensioner. Pivot arm 5 and pivot arm 55 are each urged to rotate into belt 200 due to the torque induced on them by the tension in belt 8 caused by tensioner assembly 15 bearing on belt 8. The tension in belt 8 causes pivot arm 5 and pivot arm 55 to rotate until the torque is opposed equally by the torque created by the hub load from belt 200. The belt 200 hub load acts against pivot arm 5 and pivot arm 55 through the center axis of bearing 12 and bearing 102 respectively. This causes a torque to be induced on each pivot arm 5 and pivot arm 55 based on the direction of the load on the respective arm and the effective arm length. Each pivot arm 5 and pivot arm 55 will rotate until the hub load torque is equal and opposite the belt 8 torque on the respective pivot arm 5 and pivot arm 55.

Figure 17A:
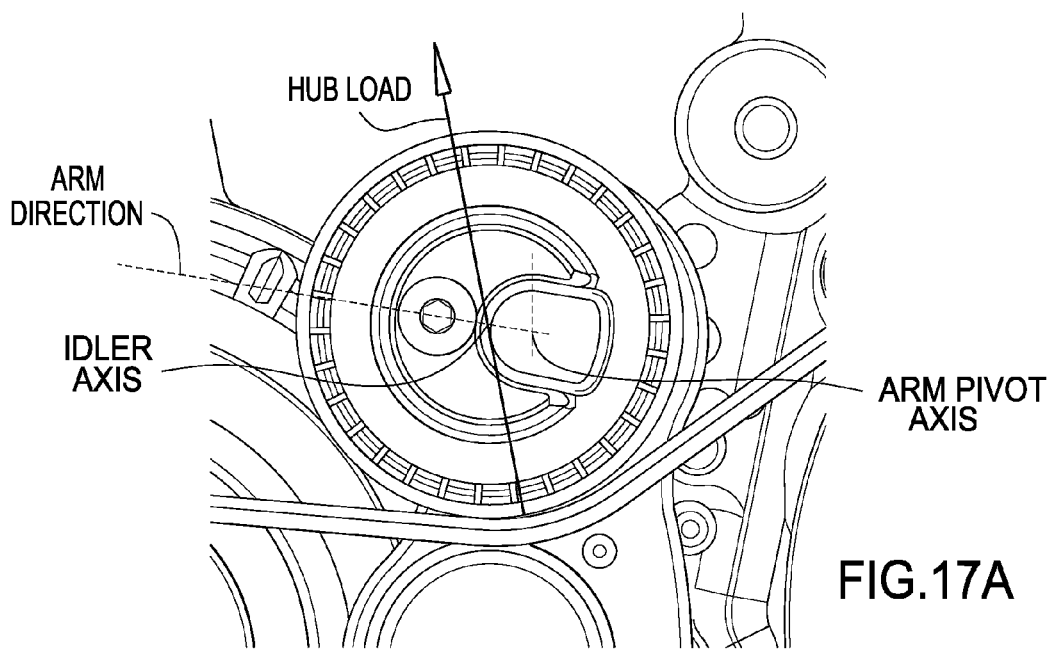
FIG. 17A is a detail of the pivot arm load conditions.
Figure 17B:
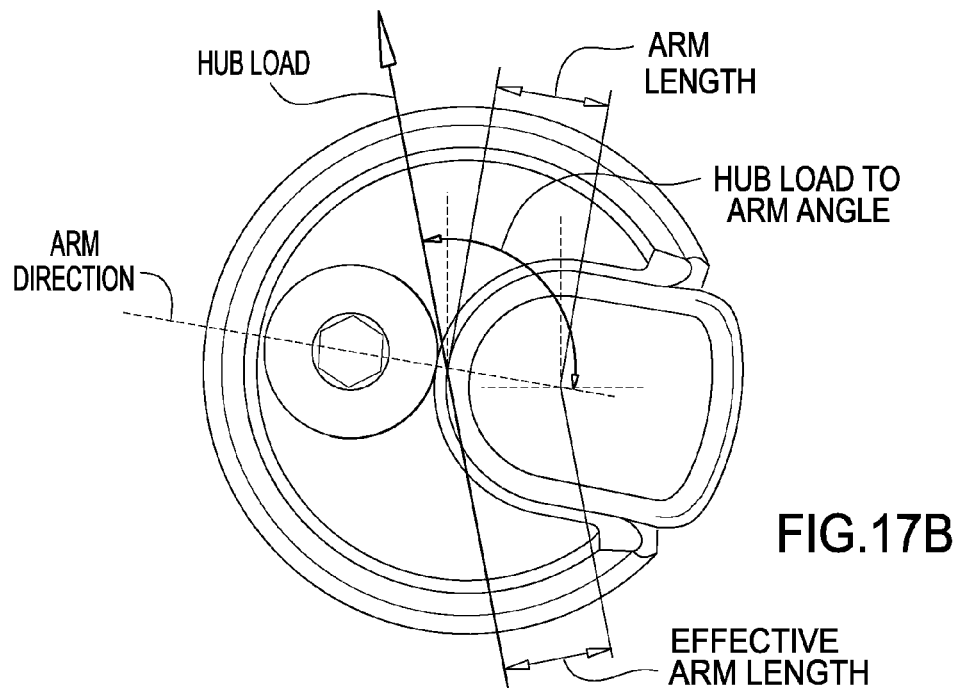
FIG. 17B is a detail of the pivot arm load conditions.

The length of the moment arm from belt 8 acting on pivot arm 5 is equal to the pitch diameter of sprocket 52 (for example, 26.3 mm). The length of the moment arm acting on pivot arm 5 from the belt 200 hub load is equal to the arm length times the sine of the angle of the force to the pivot arm 5 which is referred to as the effective arm length. FIG. 17A is a detail of the pivot arm load conditions. FIG. 17B is a detail of the pivot arm load conditions.

The length of the moment arm of belt 8 acting on pivot arm 55 is equal to the ½ pitch diameter of sprocket 552 (for example, 26.3 mm). The length of the moment arm acting on pivot arm 55 from the belt 200 hub load is equal to the arm length times the sine of the angle of the force to the pivot arm 55 which is also referred to as the effective arm length.

In a belt drive, when the torsion angle of a belt around a pulley is 60 degrees the hub load created by the tension in the belt is roughly equal to the tension in the belt. For instance, if the tension in each span of the belt is 100N, then the hub load on a pivot arm 5 would equal 100N when the torsion angle is 60 degrees.

The torque created in pivot arm 5 is then the hub load 100N times the effective arm length. If the effective arm length is 7 mm, then the torque on pivot arm 5 from the hub load is 100N×0.007 m=0.70 Nm.

The tension in belt 8 would then need to be 0.7 Nm/0.0263 m=26.6N to create an equal and opposite torque on pivot arm 5 and pivot arm 55.

As can be seen from the previous example, the tension in belt 8 need only be roughly ¼ that of the belt 200 slack side tension. This is the ratio of the effective arm length to the radius of sprocket 52 and sprocket 552.

Figure 18:
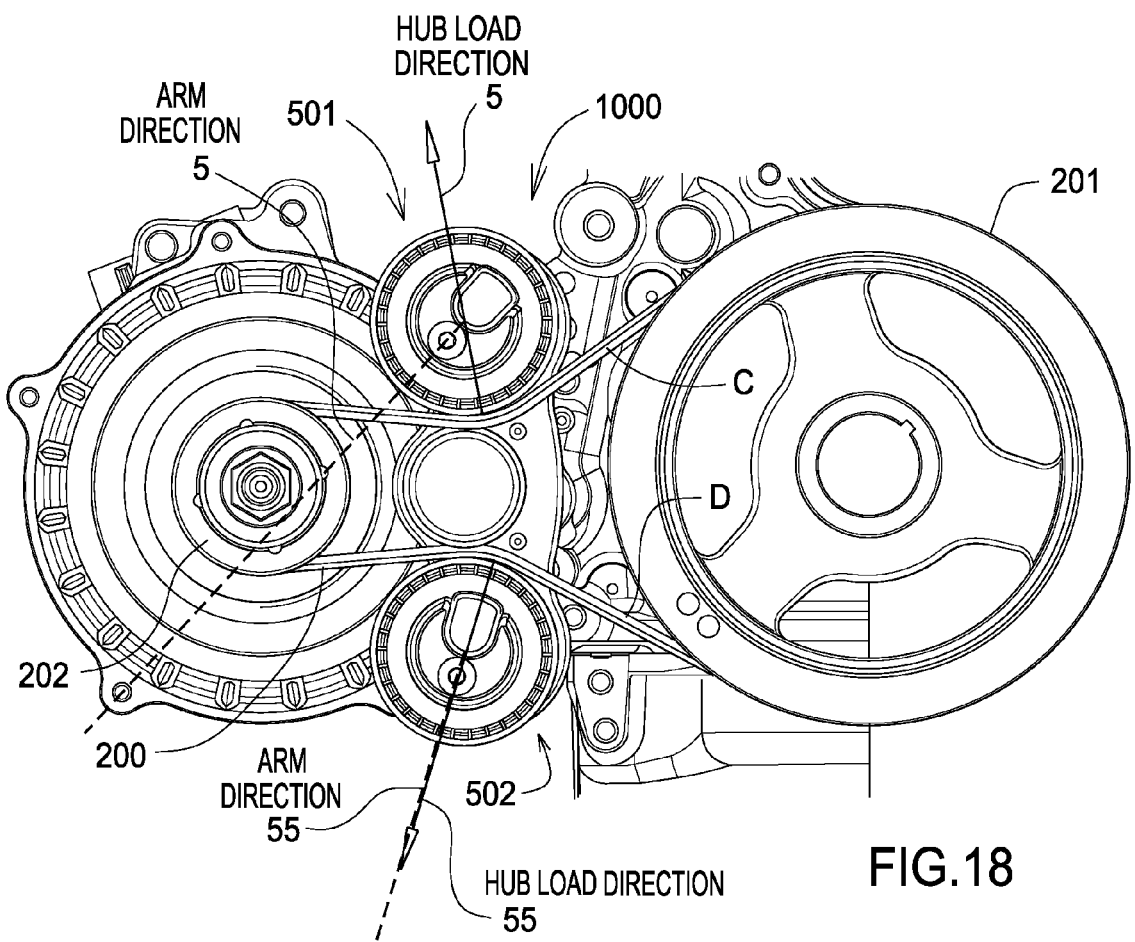
FIG. 18 shows the orientation of pivot arm 5 and pivot arm 55 and the hub load in the alternator starting mode position.

FIG. 18 shows the orientation of pivot arm 5 and pivot arm 55 and the hub load in the alternator starting mode position. During a starting event in which the alternator becomes the driver pulley in the system instead of the crankshaft, the upper span (C) in FIG. 18 becomes the slack side span and the lower belt span (D) the tight side span. If the alternator supplies 60 Nm of torque for a starting event, the tight side tension must rise to a level capable of supporting this level of power transmission. During a start event, the lower pivot arm 55 is forced to rotate by the increased tension in belt 200. The tension in belt 200 rises to a level that is sufficient to start the engine rotating, that is, driving the crankshaft.

In belt drives, the ratio of the tight side tension to the slack side tension about a pulley is known as the tension ratio. To maintain proper belt function in an ABDS drive, it is necessary that the tension ratio be approximately 5.

For a starting event requiring 60 Nm torque supplied by the alternator, the difference in tension about the alternator pulley required to create 60 Nm torque is:

$$\text{Torque} = r * \Delta T = r(T2 - T1) \qquad \text{(Eq. 1)}$$

Where
T2=tight side tension
T1=slack side tension
R=pulley radius=0.030 m solving for ΔT:
ΔT=Torque/r=60/0.030=2000N It is known that the slack side tension must be such that a tension ratio of 5 is maintained for proper ABDS system function. So:

$$T2/T1=5 \quad (Eq. 2)$$

It is known that $$\Delta T = T2 - T1 \quad (Eq. 3)$$

Solving for T2 in Eq. 3

$$T2 = \Delta T + T1$$

Substituting into Eq. 2 and solving for T1

$$(\Delta T + T1)/T1 = 5$$

$$\Delta T + T1 = 5T1$$

$$\Delta T = 4T1$$

$$\Delta T/4 = T1$$

$$2000/4 = T1$$

$$T1 = 500N$$

Substituting back into Eq. 2

$$T2/T1 = 5$$

$$T2/500 = 5$$

$$T2 = 2500N$$

The high tension in the tight side span (T2) (see (D) FIG. 18) during the starting event causes the hub load acting on pivot arm 55 to create a torque that causes the arm to rotate to a position where the arm direction is essentially parallel with the direction of the hub load, see FIG. 18. This has the effect of temporarily transforming tensioner assembly 502 into a fixed idler. The amount of rotation of tensioner assembly 502 pivot arm 55 is approximately 65 degrees.

The arrangement of pivot arm 5 and pivot arm 55 is such that as each rotates toward belt 200 the movement of pulley 10 and pulley 101 respectively toward the belt 200 per degree of rotation is greater than when each pivot arm rotates away from belt 200. This requires that the angle of rotation of the slack side tensioner assembly 501 be less than that moved by the tight side tensioner assembly 502 in order to maintain the same belt length. Table 1 shows the amount of rotation of each pivot arm 5 and pivot arm 55 during a starting event with no belt stretch.

TABLE 1

| Position | Belt length | Δ angle Top Arm 5 | Δ angle Bottom Arm 55 |
|---|---|---|---|
| Nominal (no load) | 884.2 mm | — | — |
| Alternator starting | 884.2 mm | 25° | 65° |

Since belt 200 stretches due to loading, the slack side pivot arm 5 must compensate for this stretch. Assuming the amount of belt stretch due to loading is 3 mm, the slack side tensioner must rotate an additional 30 degrees to take up this additional belt length. Table 2 shows the amount of rotation of each pivot arm 5 and pivot arm 55 during a starting event and includes the information taking belt stretch into account.

TABLE 2

| Position | Belt length | Δ angle Top Arm 5 | Δ angle Bottom Arm 55 |
|---|---|---|---|
| Nominal (no load) | 884.2 mm | — | — |
| Alternator start (no stretch) | 884.2 mm | 25° | 65° |
| Alternator start (with stretch) | 887.2 mm | 55° | 65° |

As can be seen in Table 2, the slack side tensioner pivot arm 5 must rotate an additional 30 degrees to account for the stretch of belt 200. FIG. 22A illustrates pivot arm position during an operating condition. FIG. 22B illustrates pivot arm position during an operating condition. FIG. 22C illustrates pivot arm position during an operating condition. FIG. 22D illustrates pivot arm position during an operating condition.

Additionally, the arrangement is such that the slack side pivot arm 5 effective arm length is reduced as it moves toward belt 200. This reduction in effective arm length enables the inventive device to increase slack side tension and thus increase the overall belt 200 tension during events such as alternator starting. This is accomplished because the tension in belt 8 is controlled via the tensioner assembly 15. Tensioner assembly 15 induces a torque on pivot arm 5 that must be opposed by the hub load of belt 200 as previously described. Fifty-Five degrees of rotation of the slack side pivot arm 5 reduces its effective arm length from 7 mm to 4.2 mm.

Since tensioner assembly 15 controls the tension in belt 8 and thereby belt 200, it controls the torque in pivot arm 5. The rotation angle of pivot arm 5 is less than the rotation angle of pivot arm 55 by 10 degrees. This effectively shortens the span of belt 8 acting upon tensioner assembly 15, thereby causing rotation of tensioner assembly 15. The rotation of tensioner assembly 15 causes the tension in belt 8 to increase. Increasing tension in belt 8 increases the torque on pivot arm 5 and pivot arm 55. The hub load force creating the opposing torque on pivot arm 5 and pivot arm 55 must increase to reach equilibrium.

To calculate the tension on belt 200 which is approximately equal to the hub load as previously shown, one simply divides the torque on pivot arm 5 from belt 8 by the new effective arm length. The new tension in belt 8 is 81N. The torque on pivot arm 5 from belt 8 is 2.13 Nm. The tension in belt 200 is 2.13 Nm/0.0042 m=507N. This tension is above the minimum slack side tension (T1) calculated earlier and creates the proper overall belt tension. The inventive device's ability to increase slack side tension is advantageous in that it allows overall initial tensions to be reduced which is beneficial for belt life and accessory life.

Hence, for a 60 Nm starting event, the inventive device provides the minimum 500N slack side tension. For a 60 Nm regenerative braking event, the inventive device provides the minimum 500N slack side tension. For no load situations, the inventive device provides reduced slack side tension of 100N. For medium load situations such as 20 Nm alternator load, the inventive device provides the necessary slack side tension of 167N.

Please note that all numeric values used in this description are only examples used for the purpose of illustration and are not intended to limit the scope of the invention.

Damping belt vibration is also an important function of tensioners. Damping is most often accomplished by creating resistance to movement in the tensioner pivot arm. It is generally considered advantageous to have asymmetric damping in ABDS tensioners. Asymmetric damping is a condition where resistance to tensioner arm movement differs depending on the direction of tensioner pivot arm movement.

Figure 19:
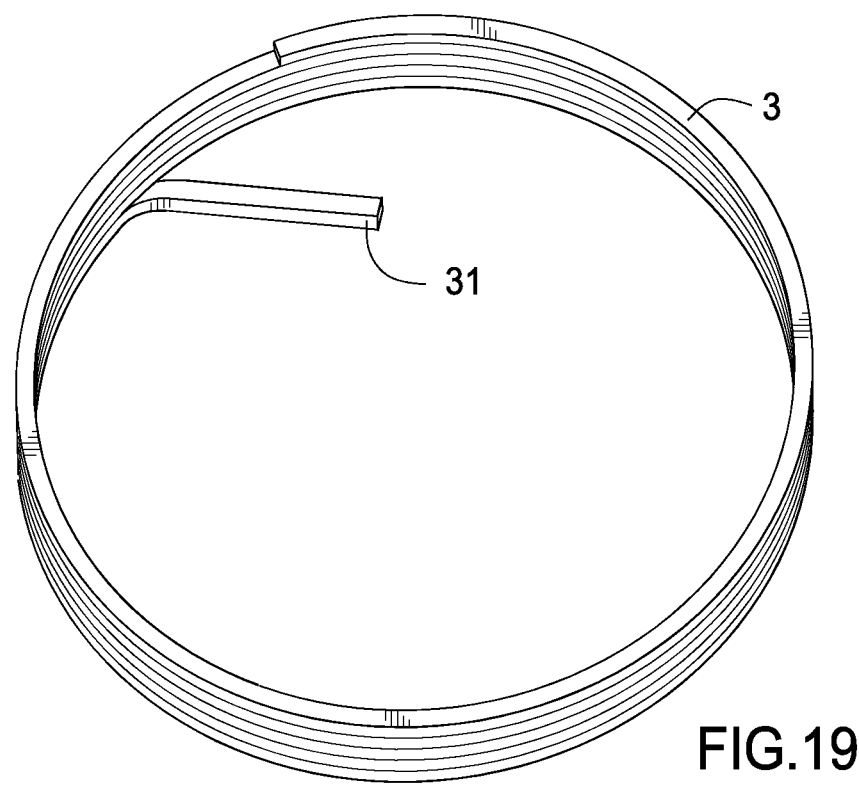
FIG. 19 is a detail of a clutch spring.
Figure 20:
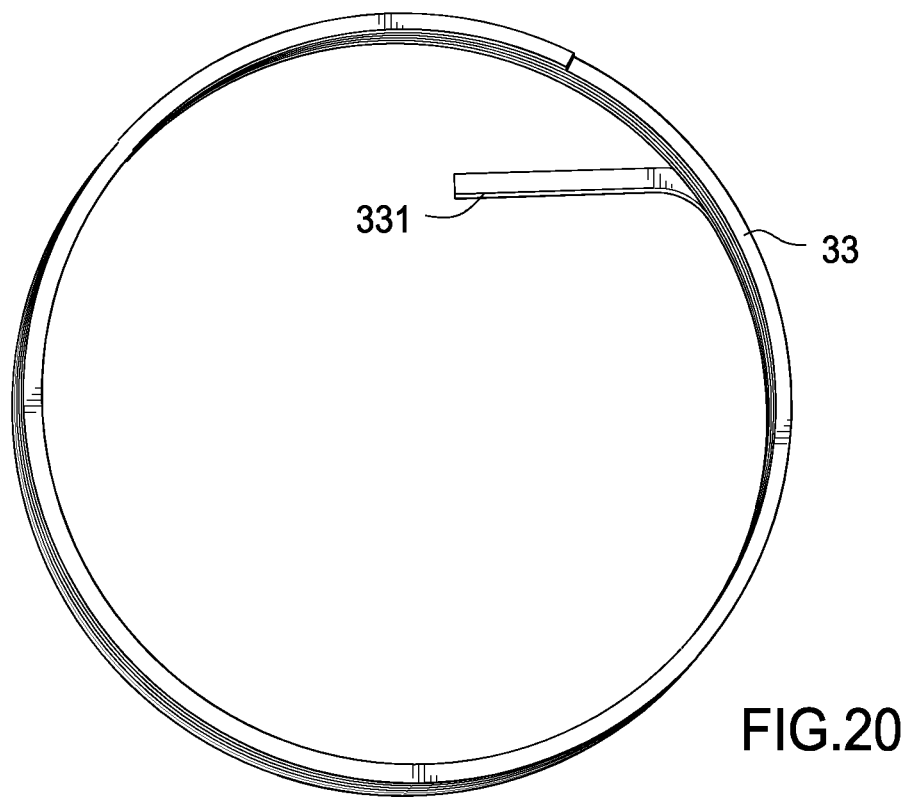
FIG. 20 is a detail of a clutch spring.
Figure 21:
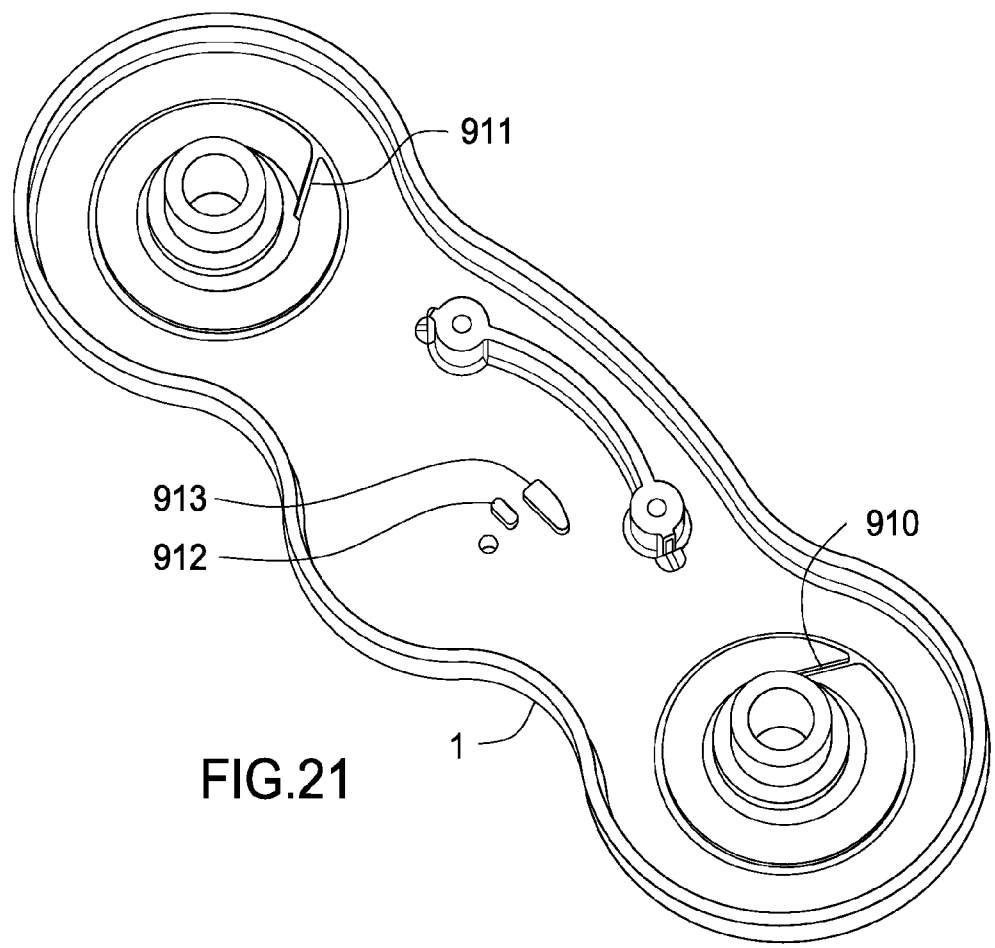
FIG. 21 is a detail of the base.

FIG. 19 is a detail of a clutch spring. FIG. 20 is a detail of a clutch spring. Damping in the inventive tensioner is created through the interaction of damping assembly 4 with clutch spring 3 and pivot arm 5, and by interaction of damping assembly 44 with clutch spring 33 and pivot arm 55. Clutch spring 3 is a right hand wind and clutch spring 33 is a left hand wind. Clutch spring 3 is attached to base 1 through the engagement of tang 31 into slot 911. Clutch spring 33 is attached to base 1 through the engagement of tang 331 into slot 910, see FIG. 21. FIG. 21 is a detail of the base.

Clutch spring 3 acts as a one way clutch against damping assembly 4. Clutch spring 3 limits damping assembly 4 so it will only rotate freely in the direction in which the pivot arm 5 rotates toward the belt 200. Damping assembly 4 is configured such that damping shoe 41 creates outward pressure on damping ring 42 which in turn is forced outward into contact with damping surface 51 of pivot arm 5. The normal force created by this outward pressure combines with the friction coefficient of damping ring 42 on the pivot arm 5 to create a frictional force resisting movement between damping assembly 4 and pivot arm 5. The friction force causes damping assembly 4 to urge pivot arm 5 to rotate whenever damping assembly 4 rotates.

Clutch spring 33 acts as a one way clutch against damping assembly 44. Clutch spring 33 limits damping assembly 44 so it will only rotate freely in the direction in which pivot arm 55 rotates toward the belt 200. Damping assembly 44 is configured such that damping shoe 441 creates outward pressure on damping ring 442 which in turn is forced outward into contact with damping surface 551 of pivot arm 55. The normal force created by this outward pressure combines with the friction coefficient of damping ring 442 on pivot arm 55 to create a frictional force resisting movement between the damping assembly 44 and pivot arm 55. The friction force causes damping assembly 44 to cause pivot arm 55 to rotate whenever damping assembly 44 rotates.

During vehicle operation in which the tight span of belt 200 is engaged with tensioner assembly 15, as belt 200 tension increases, the torque exerted by the hub load on pivot arm 5 increases causing pivot arm 5 to rotate away from belt 200. During this movement away from belt 200, clutch spring 3 locks against damping assembly 4 eliminating the ability of damping ring 4 to rotate with pivot arm 5, which stops pivot arm 5 from rotating. Pivot arm 5 can then only rotate after the torque caused by the increasing hub load exceeds the resistance from damping assembly 4. In addition, the tension in the slack side span of belt 200 drops and the respective pivot arm 55 moves into belt 200. Since in this direction of rotation the clutch spring 33 clutch releases, pivot arm 55 freely rotates and thereby maintains proper slack span belt tension.

During vehicle operation in which the tight span is against tensioner assembly 502, as belt 200 tension increases, the torque exerted by the hub load on pivot arm 55 increases causing the arm to rotate away from belt 200. During this movement away from belt 200, clutch spring 33 locks against damping assembly 44 eliminating the ability of damping assembly 44 to rotate with pivot arm 55, thereby stopping pivot arm 55. Pivot arm 55 can only rotate after the torque caused by the increasing hub load exceeds the resistance from damping assembly 44. In addition, the tension in the slack side span of belt 200 drops and the respective pivot arm 5 moves into belt 200. Since in this direction of rotation the clutch spring 3 clutch releases pivot arm 5, pivot arm 5 freely rotates and thereby maintains proper slack span belt tension in belt 200.

The rotational resistance of pivot arm 5 caused by damping assembly 4 acting with clutch spring 3 creates a greater resistance to movement in one direction than the other. The unequal resistance to rotation creates asymmetric damping in tensioner assembly 501.

The rotational resistance of pivot arm 55 caused by damping assembly 44 acting with clutch spring 33 creates greater resistance to movement in one direction than the other. This unequal resistance to rotation creates asymmetric damping in tensioner assembly 502.

BAS systems also operate in normal modes in which the alternator loads the crankshaft pulley through belt 200, for example, when the alternator is generating electrical power.

BAS systems also operate in modes in which the alternator is used to highly load the crankshaft pulley and in turn assist vehicle breaking, also referred to as regenerative braking. In regenerative braking events the loading of the belt is opposite of that described above in the alternator starting event. In this case the function of the inventive tensioner is merely switched such that the tight span of belt 200 bears on tensioner assembly 501 and the slack side span of belt 200 bears on tensioner assembly 502.

Further embodiments include, but are not limited to, sprocket 52 and sprocket 552 are each individually or in combination, non-circular in shape. Each sprocket 52 and sprocket 552 can be non-coaxial with pivot arm 5 and pivot arm 55 pivot axis respectively. Sprocket 52 and sprocket 552 can be eccentric to pivot arm 5 and pivot arm 55 and each can have a different offset respectively. Pivot arm 5 can have a different eccentric offset from pivot arm 55. Sprocket 52 and sprocket 552 can be different diameter. Belt 8 need not be an endless plurality of evenly spaced teeth, namely, belt 8 can have ends wherein span 81 is not present. Belt 8 need not be an endless plurality of evenly spaced teeth but rather only needs to be toothed at the interface with sprocket 52 and sprocket 552. Belt 8 can be a flexible endless member such as a flat belt, strap, rope or cable capable of carrying a tensile load. Belt 8 can be a rigid bar hinged near tensioner assembly 15. Belt 8 can be replaced by a compressible member representing span 81 of belt 8.

Figure 26:
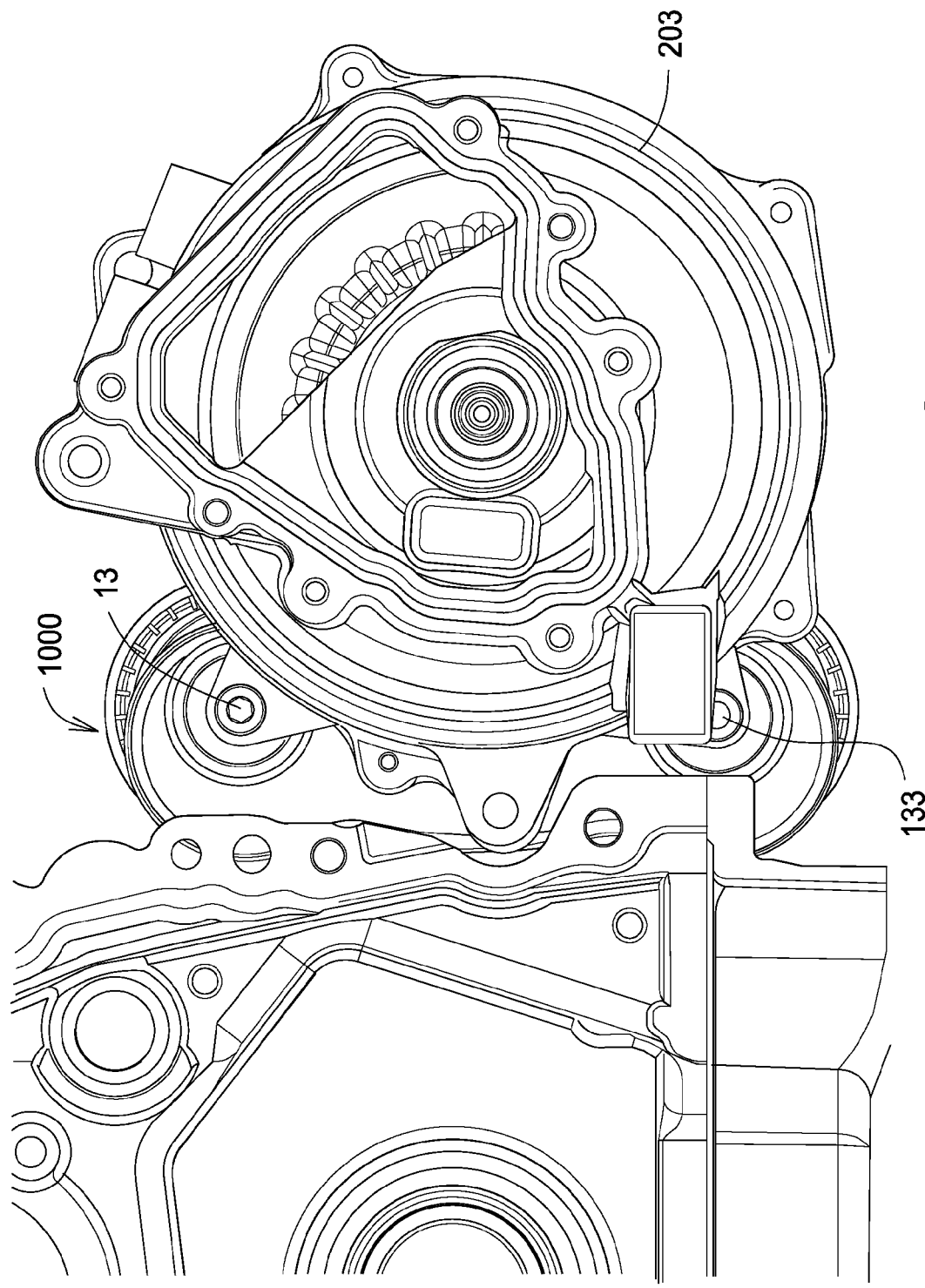
FIG. 26 is a rear detail of the tensioner mounted to the alternator.

FIG. 26 is a rear detail of the tensioner mounted to the alternator. Fastener 13 and fastener 133 are used to attach the tensioner 1000 to an alternator 203.

Figure 27:
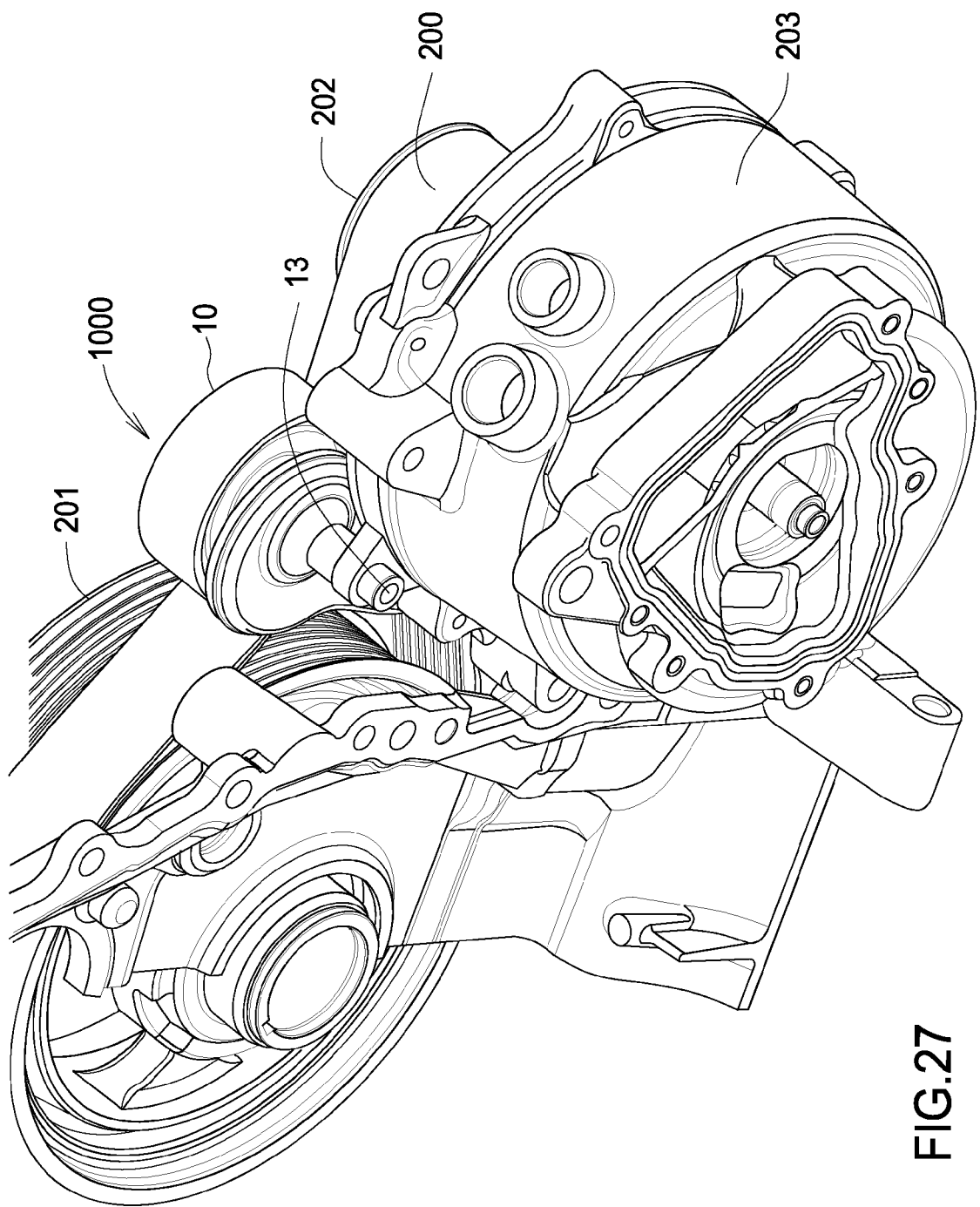
FIG. 27 is a rear top view detail of the tensioner mounted to the alternator.

FIG. 27 is a rear top view detail of the tensioner mounted to the alternator.

FIG. 28 is a bottom view of the tensioner arm. End 1541 of spring 154 engages between tab 1530 and tab 1531 on pivot arm 153.

FIG. 29 is a perspective view of section 29-29 in FIG. 2. Damping assembly 4 frictionally engages surface 51 of pivot arm 5. Damping assembly 44 frictionally engages surface 551 of pivot arm 55. Clutch spring 3 frictionally engages damping shoe 41. Clutch spring 33 frictionally engages damping shoe 441. Clutch spring 3 and clutch spring 33 are each loaded in the unwinding direction, which means the diameter of each expands as the imparted load increases. Expansion of clutch spring 3 presses damping shoe 41 against damping ring 42 which in turn presses against surface 51, which slows or stops rotation of pivot arm 5. Expansion of clutch spring 33 presses damping shoe 441 against damping ring 442 which in turn presses against surface 551, which slows or stops rotation of pivot arm 55.

For example, if belt 8 moves in direction (M1), clutch spring 3 will be loaded in the winding direction and therefore will not resist rotation of pivot arm 5. However, clutch spring 33 will be loaded in the unwinding direction and therefore damping assembly 44 will resist rotation of pivot arm 55.

If belt 8 moves in direction (M2), clutch spring 3 will be loaded in the unwinding direction and therefore will resist rotation of pivot arm 5. However, clutch spring 33 will be loaded in the winding direction and therefore damping assembly 44 will not resist rotation of pivot arm 55.

Tensioner assembly 15 will maintain load in belt 8 regardless of the direction of movement of belt 8. Tensioner assembly 15 will maintain load in belt 200 through each pivot arm 5 and pivot arm 55 regardless of the direction of movement of belt 200.

Although a form of the invention has been described herein, it will be obvious to those skilled in the art that variations may be made in the construction and relation of parts and method without departing from the spirit and scope of the invention described herein.

We claim:

1. A tensioner comprising:
   a base;
   a first pivot arm pivotally engaged to the base, a first pulley journalled to the first pivot arm;
   a second pivot arm pivotally engaged to the base, a second pulley journalled to the second pivot arm;
   a flexible tensile member having a toothed engagement with the first pivot arm and a toothed engagement with the second pivot arm whereby the first pivot arm and the second pivot arm move in a coordinated manner; and
   a tensioner assembly pivotally engaged to the base and engaged with the flexible tensile member.

2. The tensioner as in claim 1 further comprising:
   a first damping assembly frictionally engaged with the first pivot arm, the first damping assembly exerting a greater damping force on the first pivot arm in a first direction than a second direction; and
   a second damping assembly frictionally engaged with the second pivot arm, the second damping assembly exerting a greater damping force on the second pivot arm in a first direction than a second direction.

3. The tensioner as in claim 2, wherein:
   the first damping assembly comprises a first clutch spring engaged with the base, the first clutch spring loaded in an unwinding direction; and
   the second damping assembly comprises a second clutch spring engaged with the base, the second clutch spring loaded in an unwinding direction.

4. The tensioner as in claim 3, wherein the first clutch spring is wound in a direction opposite that of the second clutch spring.

5. The tensioner as in claim 4, wherein the tensioner assembly comprises a torsion spring.

6. The tensioner as in claim 1, wherein:
   the first pivot arm comprises a bore for receiving a fastener; and
   the second pivot arm comprises a bore for receiving a fastener.

7. The tensioner as in claim 1, wherein the flexible tensile member comprises a toothed belt.

8. The tensioner as in claim 4, wherein the first damping assembly comprises a first damping shoe disposed radially inward of a first damping ring, the first damping shoe engagable with the first clutch spring, the first damping ring engaged with the first pivot arm.

9. The tensioner as in claim 4, wherein the second damping assembly comprises a second damping shoe disposed radially inward of a second damping ring, the second damping shoe engagable with the second clutch spring, the second damping ring engaged with the second pivot arm.

10. The tensioner as in claim 1 mounted to an alternator.

\* \* \* \* \*